(12) United States Patent
Sasaki

(10) Patent No.: US 6,868,600 B2
(45) Date of Patent: Mar. 22, 2005

(54) METHOD OF MANUFACTURING A THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 259 days.

(21) Appl. No.: 09/971,918

(22) Filed: Oct. 9, 2001

(65) Prior Publication Data

US 2002/0057526 A1 May 16, 2002

(30) Foreign Application Priority Data

Oct. 13, 2000 (JP) ........................................ 2000-313415

(51) Int. Cl.⁷ ............................ G11B 5/127; G11B 5/17
(52) U.S. Cl. .................. 29/603.24; 29/603.23; 29/603.25; 29/603.12; 29/603.15; 29/603.14; 29/603.18; 360/122; 360/123; 216/22
(58) Field of Search ........................ 29/603.23, 603.24, 29/603.25, 603.11, 603.12, 603.13, 603.14, 603.15, 603.16, 603.18, DIG. 16; 360/122, 123, 125, FOR 213, FOR 214; 216/22

(56) References Cited

U.S. PATENT DOCUMENTS 5,075,956 A * 12/1991 Das ........................ 29/603.14
5,966,800 A * 10/1999 Huai et al. ............... 29/603.13

FOREIGN PATENT DOCUMENTS

| JP | 6-131610 | * 5/1994 | ........ 360/FOR 214 |
| JP | A-08-147625 | 6/1996 | |
| JP | A-10-269524 | 10/1998 | |
| JP | A-2000-182212 | 6/2000 | |

OTHER PUBLICATIONS

Well et al, "Magnetic Domains in Thin–Film Recording Heads as Observed in the SEM by a Lock–In Technique", IEEE Transactions on Magnetics, No. 3, May 1981, pp. 1253–1261.*

* cited by examiner

Primary Examiner—A. Dexter Tugbang
(74) Attorney, Agent, or Firm—Oliff & Berridge, PLC

(57) ABSTRACT

A method of manufacturing a thin film magnetic head having superior overwrite characteristics as well as an extremely small pole width is disclosed. The thin film magnetic head has a thin film coil provided in a recess region of a bottom pole. This makes it possible to appropriately ensure a thickness of the thin film coil, as well as to reduce a thickness of a second pole tip portion, and therefore it is possible to ensure superior overwrite characteristics, as well as to form the second pole tip portion having an extremely small uniform width. The method of manufacturing a thin film magnetic head forms a recess region in a second magnetic layer close to a first magnetic layer, and forms a first thin film coil for constituting a part of the thin film coil in the recess region.

7 Claims, 24 Drawing Sheets

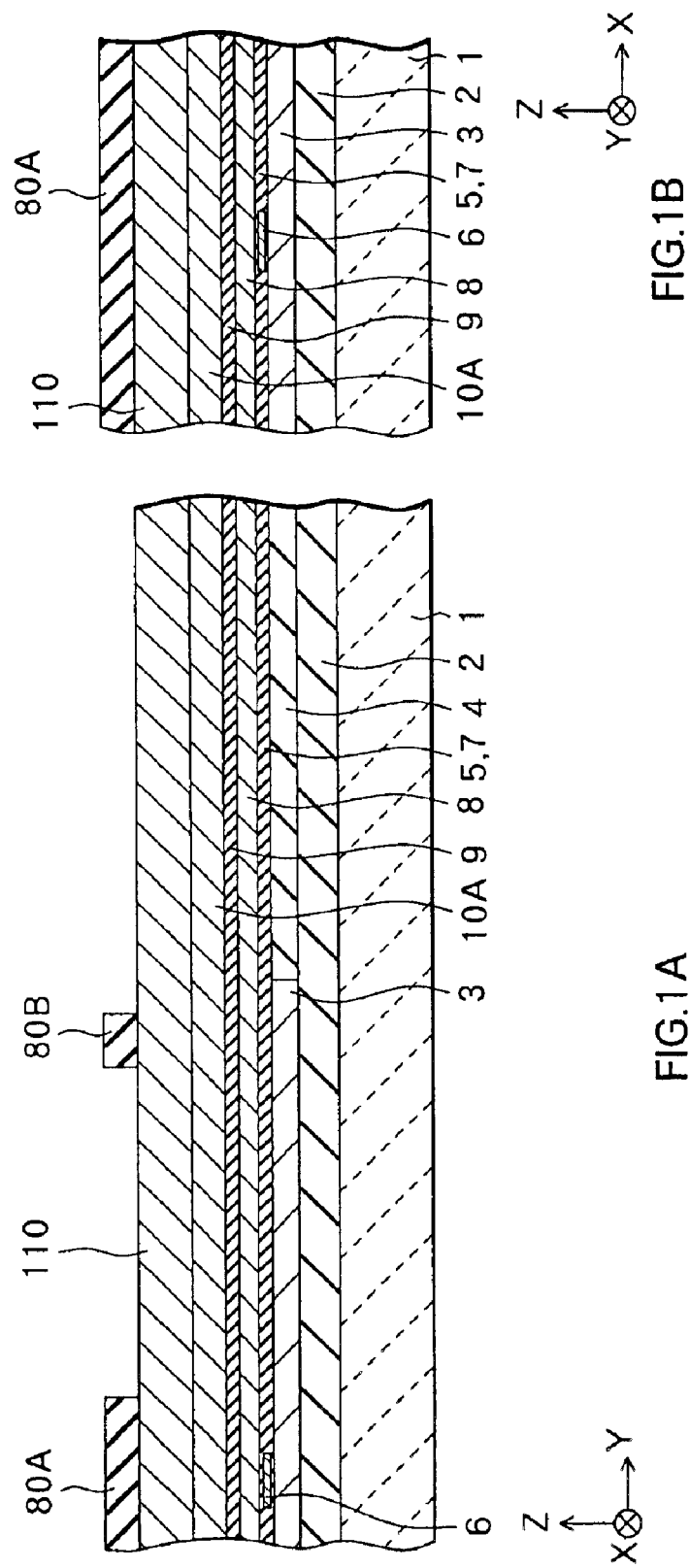

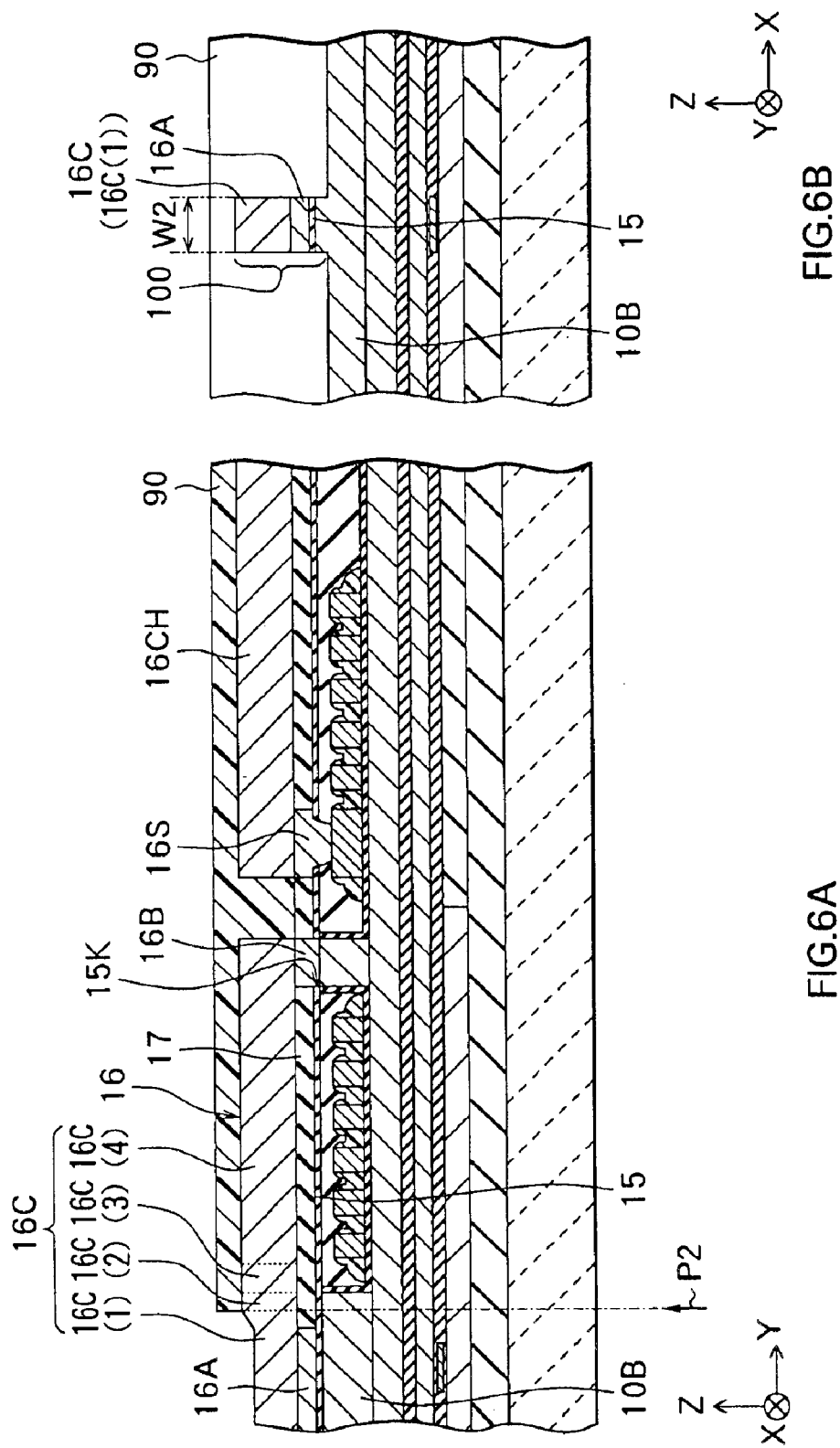

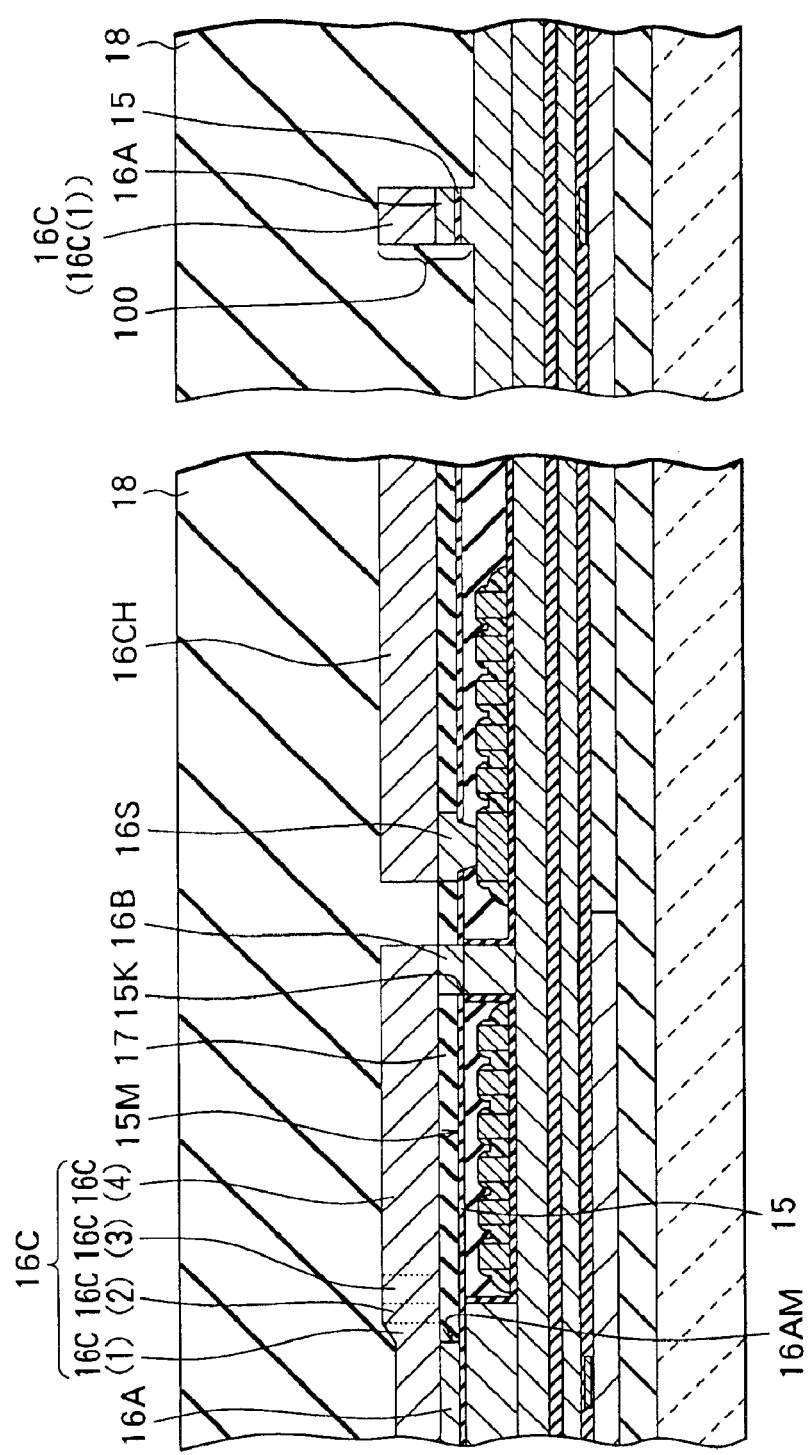

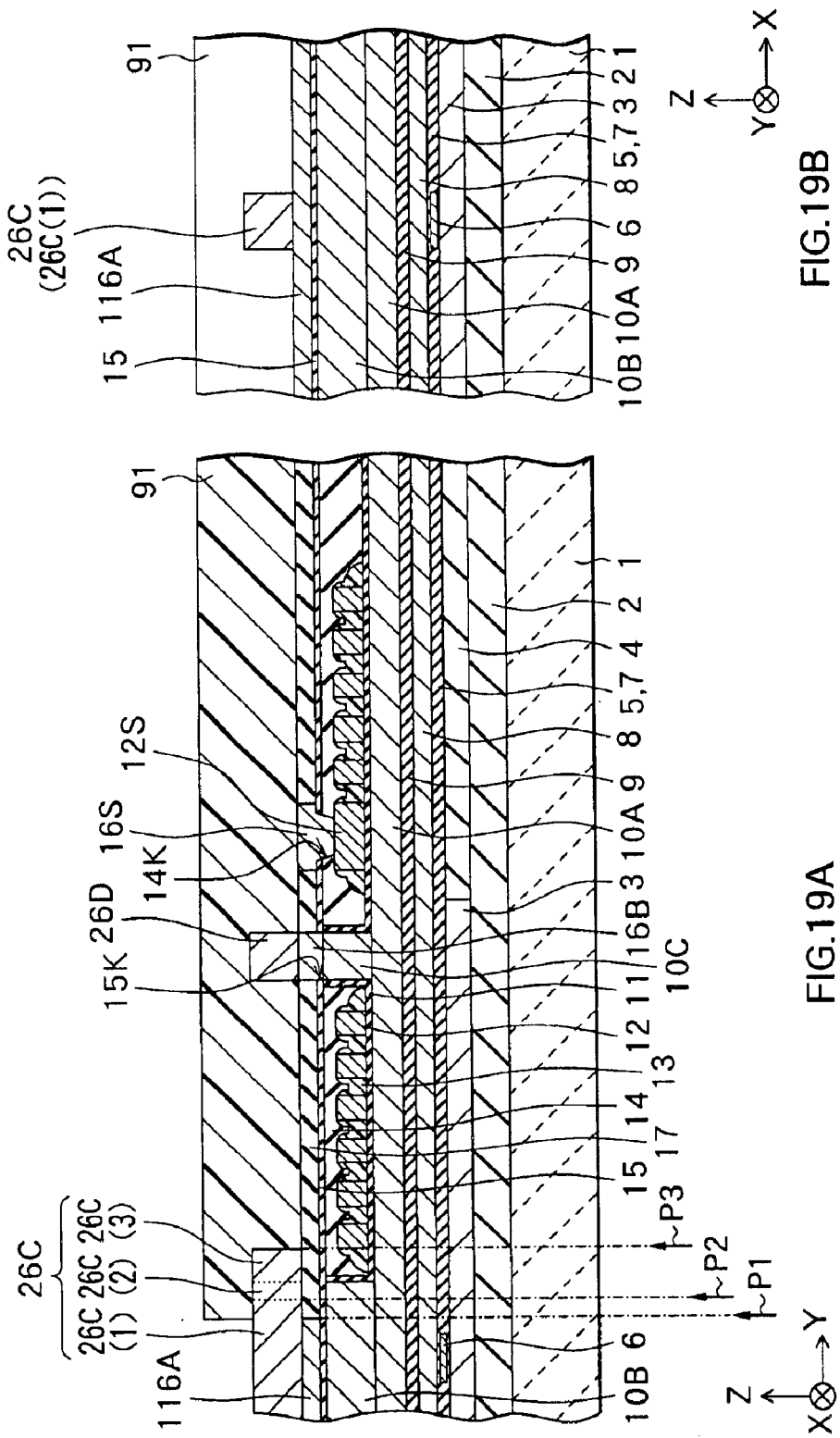

METHOD OF MANUFACTURING A THIN FILM MAGNETIC HEAD

BACKGROUND OF THE INVENTION

1. Field of the Invention

The invention relates to a thin film magnetic head having at least an inductive magnetic transducer for writing, and a method of manufacturing the same.

2. Description of the Related Art

Recently, an improvement in performance of a thin film magnetic head has been sought in accordance with an increase in an areal recording density of a hard disk drive. A composite thin film magnetic head, which has a laminated structure comprising a recording head having an inductive magnetic transducer for writing and a reproducing head having a magnetoresistive (hereinafter referred to as MR) element for reading, is widely used as the thin film magnetic head.

For example, the recording head includes a top pole and a bottom pole which are formed on and under a write gap, respectively, with the write gap in between the top and bottom poles, and a coil for generating a magnetic flux, which is formed between the top and bottom poles with an insulating layer in between the coil and each of the top and bottom poles. The top pole and the bottom pole have the same uniform width near the write gap in a region close to a recording-medium-facing surface (i.e., an air bearing surface) to be faced with a magnetic recording medium (hereinafter referred to as "a recording medium"), and these portions constitute "a pole tip portion" for defining a write track width.

To increase a recording density of the performance of the recording head, a width of the pole tip portion (i.e., a pole width) must become extremely small to the submicron order so as to increase a track density on the recording medium. In this case, it is preferable that the pole width be uniform with high accuracy throughout the pole tip portion. A partly great pole width causes the occurrence of a side erase phenomenon: that is, information is written on not only a desired track region on which the information is to be written but also track regions adjacent to the desired track region, and thus, information previously written on the track regions adjacent thereto is overwritten with the newly written information, so that the previous information is erased.

As mentioned above, a minuter pole width also requires a reduction in a thickness of a magnetic pole in itself from the viewpoint of a problem in manufacturing, and, as a consequence, there is a tendency to make all dimensions of components (e.g., the coil, etc.) of the whole head extremely small. To favorably ensure characteristics of overwriting information on the recording medium, namely, overwrite characteristics, of the performance of the recording head, it is necessary that a sufficient amount of magnetic flux be generated by the passage of a current through the coil so as to supply the generated magnetic flux to a pole portion. However, a problem exists: that is, too small a cross-sectional area of the coil owing to the tendency to make the above-mentioned components extremely small brings too high an electrical resistance value and thus causes a reduction in the amount of current passing through the coil, so that this leads to a marked reduction in the amount of generated magnetic flux. The reduction in the amount of generated magnetic flux causes the shortage of magnetic flux for magnetizing the recording medium at the time of the recording of information and thus results in a marked deterioration in the overwrite characteristics.

SUMMARY OF THE INVENTION

The invention is designed to overcome the foregoing problem. It is an object of the invention to provide a thin film magnetic head having superior overwrite characteristics as well as an extremely small pole width, and a method of manufacturing the same.

A thin film magnetic head of the invention comprises: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and the second magnetic layers, the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position, while maintaining a uniform width for defining a write track width on the recording medium, the first magnetic layer portion including a uniform width portion and a widened portion, the uniform width portion extending from the recording-medium-facing surface or its neighborhood to a second position located at or near the first position, while maintaining the same width as the uniform width of the second magnetic layer portion, the widened portion extending from the second position to a third position, and having a width greater than that of the uniform width portion, wherein a recess region is formed in the second magnetic layer close to the first magnetic layer, and the thin film coil includes a first thin film coil provided in the recess region.

In the thin film magnetic head of the invention, the recess region is formed in the second magnetic layer close to the first magnetic layer, and the first thin film coil for constituting a part of the thin film coil is provided in the recess region.

In the thin film magnetic head of the invention, the insulating layer may include a first insulating layer portion provided so as to coat the first thin film coil, and a surface of the first insulating layer portion close to the first magnetic layer may be coplanar with a surface of the second magnetic layer close to the first magnetic layer.

In the thin film magnetic head of the invention, the insulating layer may further include a second insulating layer portion located adjacent to the first insulating layer portion and the second magnetic layer portion in a space defined by a thickness of at least the second magnetic layer portion, and a position of an edge of the second insulating layer portion close to the recording-medium-facing surface may match the first position of the second magnetic layer portion.

In the thin film magnetic head of the invention, a boundary surface between the second magnetic layer portion and the second insulating layer portion may be a plane. In this case, the boundary surface between the second magnetic layer portion and the second insulating layer portion may be perpendicular to a direction in which the second magnetic layer portion extends.

In the thin film magnetic head of the invention, the third position of the first magnetic layer portion may be located closer to the recording-medium-facing surface than the first thin film coil, the thin film coil may further include a second thin film coil electrically connected to the first thin film coil, and the second thin film coil may be located adjacent to the second insulating layer portion so that most of the second thin film coil is included in a space defined by a thickness of the first magnetic layer portion.

In the thin film magnetic head of the invention, a surface on which the second thin film coil is adjacent to the second insulating layer portion may be coplanar with a boundary surface between the first magnetic layer portion and the second magnetic layer portion.

In the thin film magnetic head of the invention, the insulating layer may further include a third insulating layer portion provided so as to coat the second thin film coil, and a surface of the third insulating layer portion far from the second insulating layer portion may be coplanar with a surface of the first magnetic layer portion far from the second magnetic layer portion.

In the thin film magnetic head of the invention, the thickness of the second magnetic layer portion may be 1.0 µm or less.

In the thin film magnetic head of the invention, the second magnetic layer may include a laminate of a first magnetic film pattern and a second magnetic film pattern, the first magnetic film pattern is located away from the gap layer and the second magnetic film pattern is located close to the gap layer, the first magnetic film pattern may extend away from the recording-medium-facing surface, the second magnetic film pattern may extend away from the recording-medium-facing surface so as to occupy at least a part of a space region other than the recess region, and the recess region may be formed through the use of a thickness of at least the second magnetic film pattern. In this case, the recess region may be formed through the use of a part of a thickness of the first magnetic film pattern and the thickness of the second magnetic film pattern.

In the thin film magnetic head of the invention, a magnetic material for constituting the second magnetic layer portion may have a saturation magnetic flux density which is equal to or higher than a saturation magnetic flux density of a magnetic material for constituting the first magnetic layer portion. In this case, the first magnetic layer portion may be made of a magnetic material containing iron, nickel and cobalt, and the second magnetic layer portion may be made of a magnetic material containing either a nickel-iron alloy or a cobalt-iron alloy.

In the thin film magnetic head of the invention, at least a part of the first and second magnetic layers may be made of a magnetic material containing iron nitride, a nickel-iron alloy or an amorphous alloy. Preferably, the amorphous alloy is a cobalt-iron alloy, a zirconium-cobalt-iron alloy oxide or a zirconium-iron alloy nitride.

In the thin film magnetic head of the invention, at least a part of the first and second magnetic layers may be made of a magnetic material containing iron, nickel and cobalt.

A method of manufacturing a thin film magnetic head including a first magnetic layer and a second magnetic layer magnetically coupled to each other and having two magnetic poles facing each other with a gap layer in between near and in a recording-medium-facing surface to be faced with a recording medium, a thin film coil provided between the first and second magnetic layers, and an insulating layer for insulating the thin film coil from the first and the second magnetic layers, the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position while maintaining a uniform width for defining a write track width on the recording medium, the first magnetic layer portion including a uniform width portion and a widened portion, the uniform width portion extending from the recording-medium-facing surface or its neighborhood to a second position located at or near the first position, while maintaining the same width as the uniform width of the second magnetic layer portion, and the widened portion extending from the second position to a third position and having a width greater than that of the uniform width portion, the method comprising: a first step of forming a recess region in the second magnetic layer close to the first magnetic layer; and a second step of forming a first thin film coil for constituting a part of the thin film coil in the recess region.

In the method of manufacturing a thin film magnetic head of the invention, the first step includes forming the recess region in the second magnetic layer close to the first magnetic layer, and the second step includes forming the first thin film coil for constituting a part of the thin film coil in the recess region.

In the method of manufacturing a thin film magnetic head of the invention, when the insulating layer includes a first insulating layer portion for coating the first thin film coil, the method may further compris: a third step of forming a first precursory insulating layer functioning as a preparatory layer for the first insulating layer portion, so as to coat at least the recess region of the second magnetic layer in which the first thin film coil is formed and a peripheral region around the recess region; and a fourth step of forming the first insulating layer portion by polishing and flattening the first precursory insulating layer until at least the second magnetic layer is exposed.

In the method of manufacturing a thin film magnetic head of the invention, when the insulating layer further includes a second insulating layer portion adjacent to the first insulating layer portion, the method may further comprise: a fifth step of forming a precursory magnetic layer for functioning as a preparatory layer for the second magnetic layer portion, on the gap layer in a region extending over a position at which the recording-medium-facing surface is to be located to the first position; a sixth step of forming a second precursory insulating layer functioning as a preparatory layer for the second insulating layer portion, so as to coat at least the precursory magnetic layer and a peripheral region around the precursory magnetic layer; and a seventh step of polishing and flattening the second precursory insulating layer until at least the precursory magnetic layer is exposed, thereby forming the second insulating layer portion.

In the method of manufacturing a thin film magnetic head of the invention, when the third position of the first magnetic layer portion is located closer to the recording-medium-facing surface than the thin film coil and the thin film coil further includes a second thin film coil electrically connected to the first thin film coil, the method may further comprise: an eighth step of forming the second thin film coil adjacent to the second insulating layer portion so that most of the second thin film coil is included in a space defined by a thickness of the uniform width portion of the first magnetic layer portion.

In the method of manufacturing a thin film magnetic head of the invention, when the insulating layer further includes a third insulating layer portion for coating the second thin film coil, the method may further comprises: a ninth step of forming the first magnetic layer portion on at least the precursory magnetic layer; a tenth step of forming a third precursory insulating layer for functioning as a preparatory layer for the third insulating layer portion, so as to coat at least the first magnetic layer portion and the second thin film coil; and an eleventh step of polishing and flattening a surface of the third precursory insulating layer until at least the first magnetic layer portion is exposed, thereby forming the third insulating layer portion.

The method of manufacturing a thin film magnetic head of the invention may further comprise a twelfth step of selectively etching the precursory magnetic layer through the use of the uniform width portion of the first magnetic layer portion as a mask, after the ninth step, thereby forming the second magnetic layer portion.

In the method of manufacturing a thin film magnetic head of the invention, in the twelfth step, the gap layer and the second magnetic layer portion may be selectively removed to a predetermined depth, except for a region corresponding to the second magnetic layer portion.

In the method of manufacturing a thin film magnetic head of the invention, the twelfth step may take place using reactive ion etching. In this case, it is preferable that the twelfth step take place at a temperature between 50 and 300 degrees Celsius inclusive in a gaseous atmosphere containing chlorine.

In the method of manufacturing a thin film magnetic head of the invention, the first step may include the steps of: forming a first magnetic film pattern functioning as a part of the second magnetic layer; and selectively forming a second magnetic film pattern functioning as another part of the second magnetic layer, on the first magnetic film pattern except for the recess region, or the first step may include the steps of: forming a first magnetic film pattern functioning as a part of the second magnetic layer; selectively forming a second magnetic film pattern functioning as another part of the second magnetic layer, on the first magnetic film pattern except for the recess region; and etching and recessing the first magnetic film pattern to a predetermined depth through the use of the second magnetic film pattern as a mask.

BRIEF DESCRIPTION OF THE DRAWINGS

FIGS. 1A and 1B are cross sectional views for describing a step of a method of manufacturing a thin film magnetic head according to a first embodiment of the invention;

FIGS. 6A and 6B are cross sectional views for describing a step following the step of FIGS. 5A and 5B;

FIGS. 7A and 7B are cross sectional views for describing a step following the step of FIGS. 6A and 6B;

FIGS. 19A and 19B are cross sectional views for describing a step of a method of manufacturing a thin film magnetic head according to a second embodiment of the invention;

DETAILED DESCRIPTION OF THE PREFERRED EMBODIMENTS

Embodiments of the invention will be described in detail below with reference to the drawings.

[First Embodiment]

Firstly, the description is given with reference to FIGS. 1A and 1B to FIG. 13 with regard to an example of a method of manufacturing a composite thin film magnetic head as a method of manufacturing a thin film magnetic head according to a first embodiment of the invention.

Figure 9:
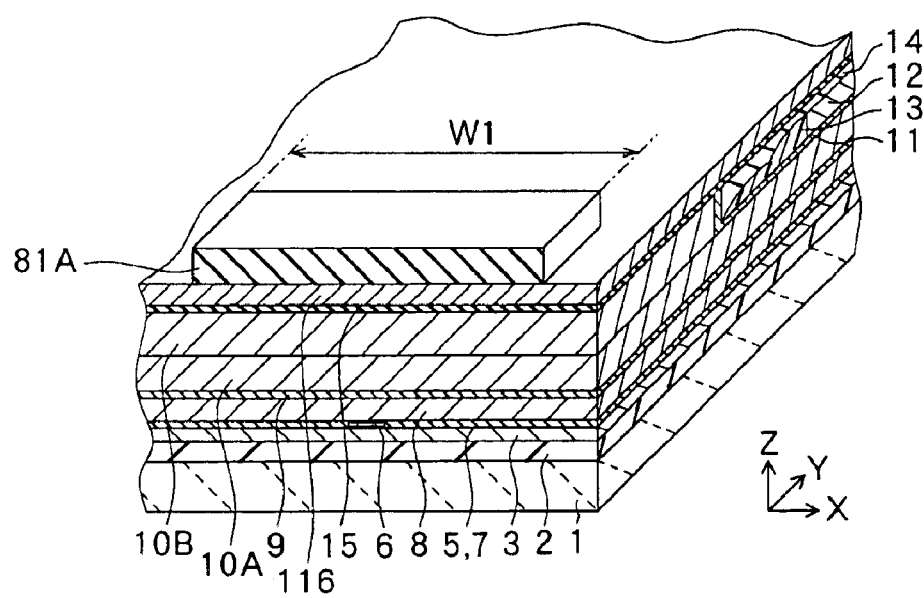
FIG. 9 is a perspective view corresponding to the cross sectional views shown in FIGS. 1A and 1B.
Figure 10:
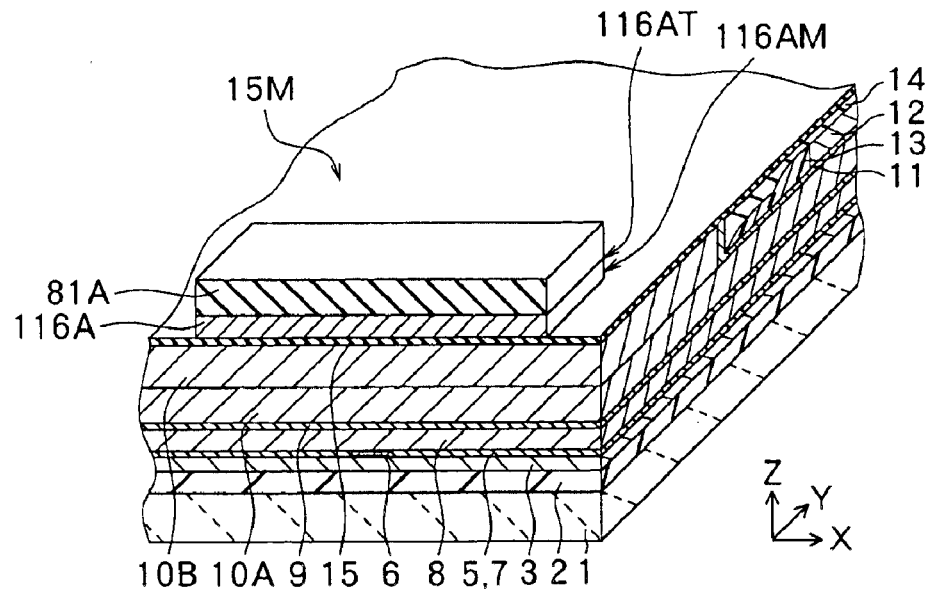
FIG. 10 is a perspective view corresponding to the cross sectional views shown in FIGS. 2A and 2B.
Figure 12:
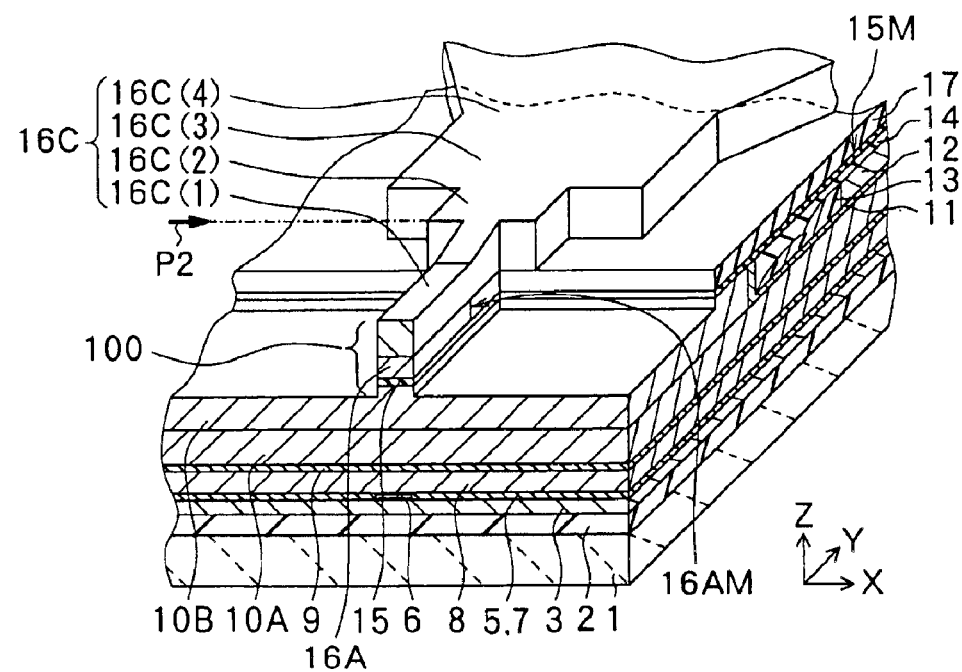
FIG. 12 is a perspective view corresponding to the cross sectional views shown in FIGS. 7A and 7B.
Figure 13:
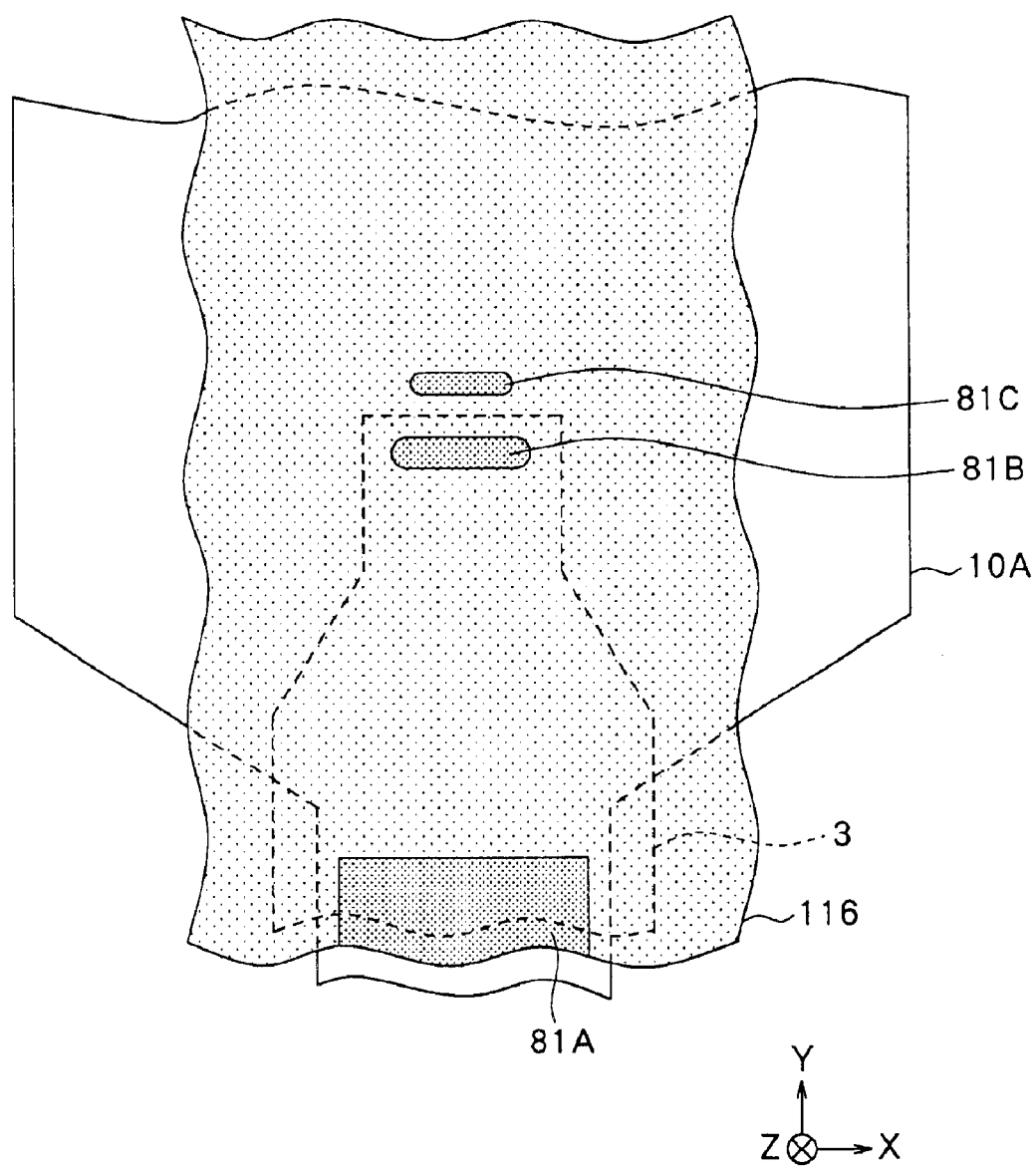
FIG. 13 is a plan view corresponding to the cross sectional views shown in FIGS. 3A and 3B.

FIGS. 1A, 2A, 3A, 4A, 5A, 6A, 7A and 8A show a cross section perpendicular to an air bearing surface (i.e., a recording-medium-facing surface), and FIGS. 1B, 2B, 3B, 4B, 5B, 6B, 7B and 8B show a cross section of a pole portion parallel to the air bearing surface. FIGS. 9 to 12 show perspective structures corresponding to main manufacturing steps. FIG. 9 corresponds to a state shown in FIGS. 3A and 3B, FIG. 10 corresponds to a state shown in FIGS. 4A and 4B, FIG. 11 corresponds to a state shown in FIGS. 5A and 5B, and FIG. 12 corresponds to a state shown in FIGS. 6A and 6B. FIG. 10 does not show a second precursory insulating layer 17P shown in FIGS. 4A and 4B, and FIGS. 11 and 12 do not show a photoresist film 90 shown in FIGS. 5A and 5B and FIGS. 6A and 6B. FIG. 13 shows a planar structure corresponding to the state shown in FIGS. 3A and 3B.

In the following description, an X-axis direction, a Y-axis direction and a Z-axis direction in FIGS. 1A and 1B to FIG. 13 are expressed as "a width direction", "a length direction" and "a thickness (depth) direction or a height direction", respectively. The side close to an air bearing surface 70 in the Y-axis direction (or the side to form the air bearing surface 70 in the following step) is expressed as "front (or frontward)", and the opposite side is expressed as "rear (or rearward)".

<Method of Manufacturing Thin Film Magnetic Head>

In the embodiment, first of all, as shown in FIGS. 1A and 1B, an insulating layer 2 made of, for example, alumina is formed with a thickness of about 3.0 $\mu$m to 5.0 $\mu$m on a substrate 1 made of, for example, altic ($Al_2O_3$—TiC). Then, a bottom shield layer 3 for a reproducing head, which is made of, for example, Permalloy (Ni: 80 wt %, Fe: 20 wt %), is selectively formed with a thickness of about 2.0 $\mu$m to 3.0 $\mu$m on the insulating layer 2 by means of, for example, frame plating. The description is given later with regard to details about frame plating. The bottom shield layer 3 is formed so as to have a planar shape shown in FIG. 14 to be described later, for example. For instance, Permalloy having the composition of 45 wt % Ni and 55 wt % Fe, as well as the above-mentioned Permalloy having the composition of 80 wt % Ni and 20 wt % Fe, may be used as Permalloy for forming the bottom shield layer 3. Then, an alumina layer, for example, is formed with a thickness of about 4.0 $\mu$m to 5.0 $\mu$m so as to coat the overall surface, and thereafter a surface of the alumina layer is polished by means of, for example, CMP (chemical mechanical polishing) until the bottom shield layer 3 is exposed, whereby the overall surface becomes flattened. Thus, an insulating film 4 is formed so that a peripheral region around the bottom shield layer 3 is filled in with the insulating film 4.

Next, as shown in FIGS. 1A and 1B, a shield gap film 5 made of, for example, alumina is formed with a thickness of about 100 nm to 200 nm on the bottom shield layer 3 by means of sputtering, for example. Then, an MR film 6 for constituting an MR element that is a principal part of the reproducing head is formed into a desired shape on the shield gap film 5 by means of high-accuracy photolithography. Then, lead layers (not shown) for functioning as lead electrode layers to be electrically connected to the MR film 6 are formed on both sides of the MR film 6. Then, a shield gap film 7 is formed on the lead layers, the shield gap film 5 and the MR film 6, and thus the MR film 6 is sandwiched in between the shield gap films 5 and 7. A material of the shield gap film 7, a method of forming the shield gap film 7 and the like are substantially the same as those of the shield gap film 5.

Next, as shown in FIGS. 1A and 1B, a top shield layer 8 is selectively formed with a thickness of about 1.0 $\mu$m to 1.5 $\mu$m on the shield gap film 7. A material of the top shield layer 8, a method of forming the top shield layer 8 and the like are substantially the same as those of the bottom shield layer 3. Then, an insulating film 9 made of, for example, alumina is formed with a thickness of about 0.1 $\mu$m to 0.2 $\mu$m on the top shield layer 8 by means of sputtering, for example.

Next, as shown in FIGS. 1A and 1B, a bottom magnetic layer 10A made of a magnetic material having a high saturation magnetic flux density, e.g., Permalloy (Ni: 45 wt %, Fe: 55 wt %), is selectively formed with a thickness of about 0.8 $\mu$m to 1.5 $\mu$m on the insulating film 9 by means of, for example, frame plating. The bottom magnetic layer 10A constitutes a part of a bottom pole 10. The bottom magnetic layer 10A is formed so as to have a planar shape shown in FIG. 14 to be described later, for example. For instance, Permalloy having the composition of 80 wt % Ni and 20 wt % Fe, as well as the above-mentioned Permalloy having the composition of 45 wt % Ni and 55 wt % Fe, may be used as Permalloy for forming the bottom magnetic layer 10A. In the embodiment, the bottom magnetic layer 10A corresponds to a specific example of "a first magnetic film pattern" of the invention.

Next, as shown in FIGS. 1A and 1B, a bottom precursory magnetic layer 110 made of a magnetic material having a high saturation magnetic flux density, e.g., iron nitride, is formed with a thickness of about 1.0 $\mu$m to 1.5 $\mu$m by means of, for example, sputtering so as to coat the overall surface. The bottom precursory magnetic layer 110 is formed so that the thickness thereof, in particular, is greater than a thickness of a thin film coil 12 to be formed in the following step. The bottom precursory magnetic layer 110 is a preparatory layer that is to be patterned into a bottom magnetic layer 10B and a bottom connecting portion 10C by means of an etching process in the following step. In the following description, a preparatory layer to be patterned into a predetermined shape in the following step as mentioned above is called "a precursory layer", which is expressed in the same manner. Besides iron nitride, for example, an amorphous alloy or the like such as a cobalt-iron alloy (FeCo), a zirconium-cobalt-iron alloy oxide (FeCoZrO) or a zirconium-iron alloy nitride (FeZrN), which has a high saturation magnetic flux density similarly to iron nitride, may be used as a material of the bottom precursory magnetic layer 110.

Next, as shown in FIGS. 1A and 1B, masks 80A and 80B made of an inorganic material, e.g., alumina, are selectively formed at predetermined positions on the bottom precursory magnetic layer 110. The masks 80A and 80B are formed so that the respective regions where the masks 80A and 80B are formed correspond to the respective regions where the bottom magnetic layer 10B and the bottom connecting portion 10C are to be formed in the following step (see FIG. 14). More specifically, for example, the mask 80A is positioned so that a position P4 (a fourth position) of a rear edge of the bottom magnetic layer 10B to be described later (see FIGS. 2A and 2B) is located rearward by about 0.5 $\mu$m or less with respect to a position of a rear edge of the MR film 6. The position P4 of the rear edge of the bottom magnetic layer 10B may be matched to the position of the rear edge of the MR film 6. Besides alumina mentioned above, aluminum nitride or the like may be used as a material of the masks 80A and 80B.

The masks 80A and 80B are formed through the following procedure, for example. That is, first, an alumina layer is formed by means of, for example, sputtering so as to coat a surface of the bottom precursory magnetic layer 110. Then, a photoresist film is formed so as to coat a surface of the alumina layer, and thereafter the photoresist film is patterned by means of photolithography so as to form a mask for etching the alumina layer. In this case, the mask is shaped so that a planar shape of the mask is substantially the same as a planar shape of each of the masks 80A and 80B to be finally formed. Then, the alumina layer is etched by means of, for example, reactive ion etching (hereinafter referred to as "RIE") using the mask made of the photoresist film, and thus the masks 80A and 80B are formed.

Figure 2A:
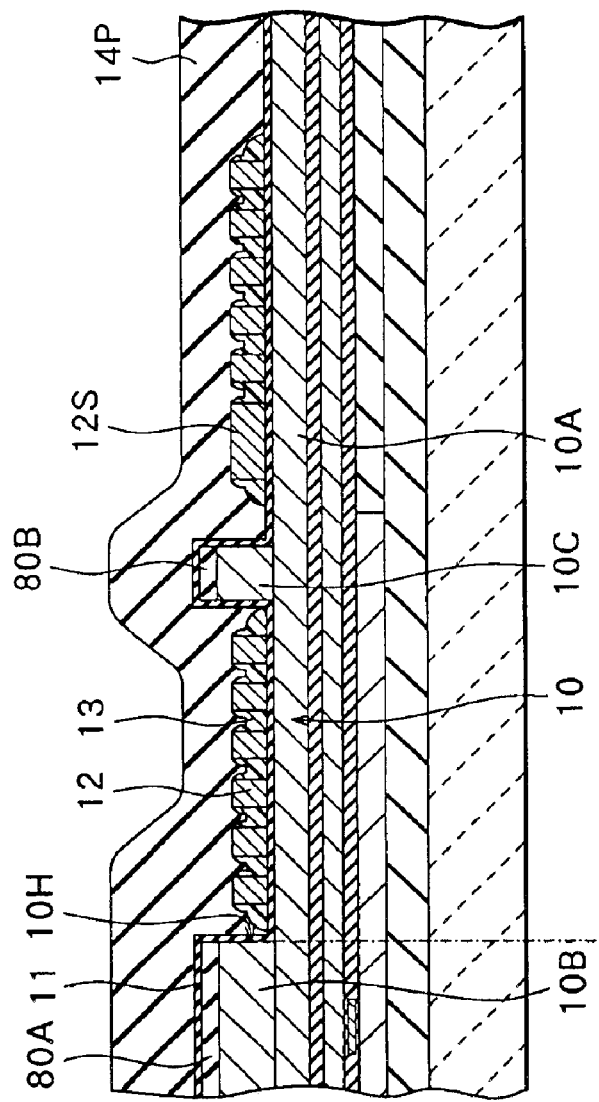
FIGS. 2A and 2B are cross sectional views for describing a step following the step of FIGS. 1A and 1B.
Figure 2B:
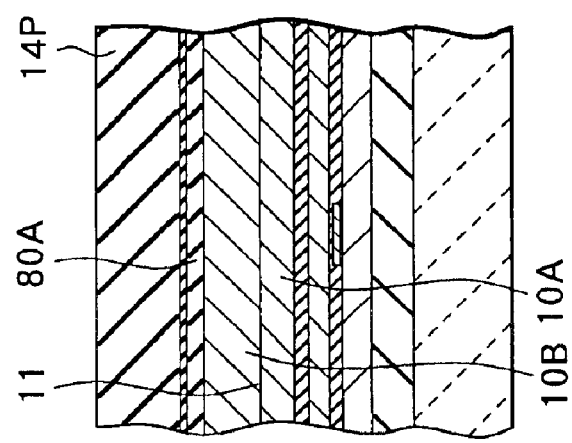

Next, the bottom precursory magnetic layer 110 is etched and patterned by means of, for example, RIE using the masks 80A and 80B until the bottom magnetic layer 10A, for instance, is exposed. This etching process selectively removes the bottom precursory magnetic layer 110 except for the regions where the masks 80A and 80B are formed, thereby selectively forming the bottom magnetic layer 10B on a frontward region on the bottom magnetic layer 10A and also selectively forming the bottom connecting portion 10C on a rearward region thereon, as shown in FIGS. 2A and 2B. A peripheral region around the bottom magnetic layer 10B and the bottom connecting portion 10C on the bottom magnetic layer 10A constitutes a recess region 10H having a depth equivalent to a thickness of the bottom magnetic layer 10B and so on. Both the bottom magnetic layer 10B and the bottom connecting portion 10C constitute a part of the bottom pole 10. The bottom magnetic layer 10B and the bottom connecting portion 10C are formed so as to have a planar shape shown in FIG. 14 to be described later, for example.

In general, the rate of etching using RIE is higher than the rate of etching using ion milling. Therefore, the use of RIE as an etching method allows forming the bottom magnetic layer 10B and so on in a shorter time, as compared to the use of ion milling. To form the bottom magnetic layer 10B and so on by means of an etching process using RIE, etching conditions such as the type of etching gas for use in etching and a processing temperature for etching, in particular, are optimized, and thus the time required for forming the bottom magnetic layer 10B and so on can become still shorter. The description is given later with regard to details about the optimization of the etching conditions. The masks 80A and 80B in themselves are also etched by the etching process for forming the bottom precursory magnetic layer 110, so that the thicknesses of the masks 80A and 80B decrease. At the time of completion of the etching process, the masks 80A and 80B may remain (see FIGS. 2A and 2B) or do not have to remain. RIE is not necessarily used as the etching method for patterning the bottom precursory magnetic layer 110, and ion milling may be used. In the embodiment, the bottom magnetic layer 10B corresponds to a specific example of "a second magnetic film pattern" of the invention, and the bottom pole 10 comprising the bottom magnetic layers 10A and 10B and the bottom connecting portion 10C corresponds to a specific example of "a second magnetic layer" of the invention.

Next, as shown in FIGS. 2A and 2B, an insulating film 11 made of, for example, alumina is formed with a thickness of about 0.2 $\mu$m to 0.3 $\mu$m so as to coat the overall surface.

Next, as shown in FIGS. 2A and 2B, a thin film coil 12 made of, for example, copper (Cu) for an inductive recording head is selectively formed with a thickness of about 0.8 $\mu$m to 1.2 $\mu$m on the flat insulating film 11 in a region located rearward with respect to the region where the bottom magnetic layer 10B is formed (except for the region where the bottom connecting portion 10C is formed), by means of electroplating, for instance. The thin film coil 12 is formed so as to have a winding structure shown in FIG. 14 to be described later, for example, and so as to have a thickness less than the thickness of the bottom magnetic layer 10B minus the thickness of the insulating film 11. Moreover, for example, the thin film coil 12 is formed so that each winding of the thin film coil 12 has a width of about 0.5 $\mu$m and the windings are spaced at intervals of about 0.3 $\mu$m. The thin film coil 12 is, only in part, shown in FIG. 2A. At the same time when the thin film coil 12 is formed, a coil connecting portion 12S for constituting an inner terminal end of the thin film coil 12 is integrally formed with the thin film coil 12 on the insulating film 11, and a terminal 12X (not shown in FIG. 2A, see FIG. 14) for constituting an outer terminal end of the thin film coil 12 is integrally formed with the thin film coil 12. In the embodiment, the thin film coil 12 corresponds to a specific example of "a thin film coil" or "a first thin film coil" of the invention.

Next, a material exhibiting fluidity during heating, e.g., an organic insulating material such as a photoresist, is formed into a predetermined pattern with a thickness of about 0.5 $\mu$m to 1.2 $\mu$m between and around the windings of the thin film coil 12 (including the coil connecting portion 12S) by means of high-accuracy photolithography. Then, this photoresist film is subjected to heat treatment at a temperature between 200 and 250 degrees Celsius inclusive, for example. This heat treatment allows the photoresist to flow and fill up a gap between the windings of the thin film coil 12 and the like, thereby forming an insulating film 13 for providing insulation between the windings of the thin film coil 12 and the like, as shown in FIG. 2A. The insulating film 13 can be formed in such a manner that the insulating film 13 does not coat the top surfaces of the thin film coil 12 and the coil connecting portion 12S (see FIG. 2A) or the insulating film 13 coats the top surfaces thereof.

Next, as shown in FIGS. 2A and 2B, a first precursory insulating layer 14P made of, for example, alumina is formed with a thickness of about 2.0 $\mu$m to 3.0 $\mu$m by means of, for example, sputtering so as to coat the overall surface, and thus a region having an uneven structure comprising the bottom magnetic layer 10B, the bottom connecting portion 10C, the thin film coil 12 and so forth is filled with the first precursory insulating layer 14P.

Figures 3A, 3B:
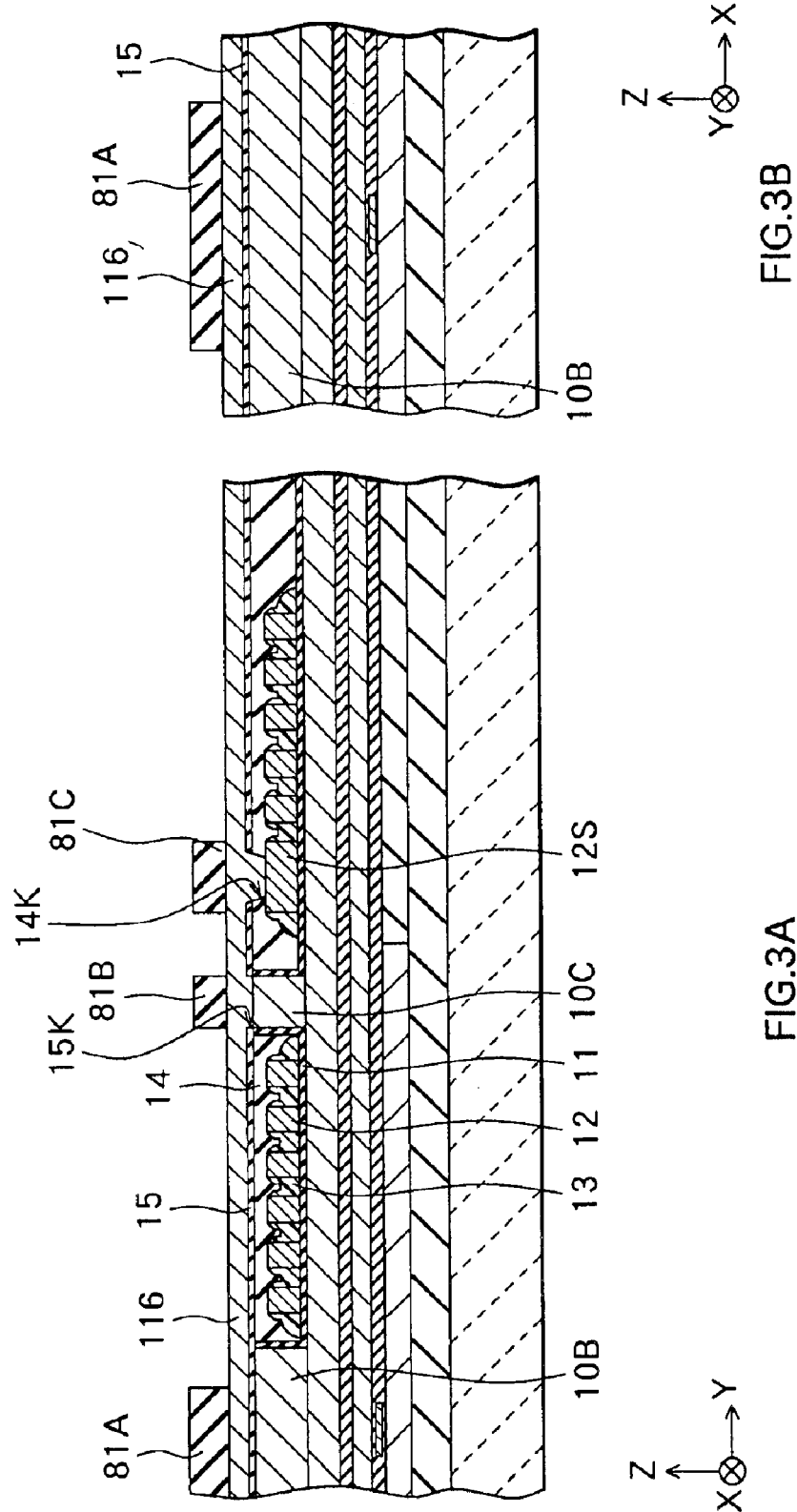
FIGS. 3A and 3B are cross sectional views for describing a step following the step of FIGS. 2A and 2B.

Next, the overall surface of the first precursory insulating layer 14P is polished and flattened by means of CMP, for example. By this polishing, an insulating film 14 for coating the thin film coil 12 and so on is formed as shown in FIG. 3A. In this case, the polishing takes place until at least the bottom magnetic layer 10B and the bottom connecting portion 10C are exposed. In the embodiment, the insulating films 11, 13 and 14 collectively correspond to a specific example of "a first insulating layer portion" of the invention.

Next, as shown in FIGS. 3A and 3B, a write gap layer 15 made of a nonmagnetic material, e.g., alumina, is flatly formed with a thickness of about 0.1 $\mu$m to 0.15 $\mu$m on the flattened surface obtained through polishing, by means of sputtering, for example. The write gap layer 15 is formed so as not to coat a surface of the bottom connecting portion 10C. This region constitutes an opening 15K for connecting the bottom connecting portion 10C to a top pole 16 to be formed in the following step. Besides alumina mentioned above, a nonmagnetic metallic material similar to alumina, e.g., a nickel-copper alloy (NiCu) or the like, may be used as a material of the write gap layer 15.

Next, as shown in FIG. 3A, the write gap layer 15 and the insulating film 14, which coat the coil connecting portion 12S, are partly removed by means of an etching process using, for example, RIE or ion milling, and thus an opening 14K for connecting the coil connecting portion 12S to a coil connecting portion 16S to be formed in the following step is formed.

Next, as shown in FIGS. 3A and 3B, a basic magnetic layer 116 is formed with a thickness of about 0.3 $\mu$m to 1.0 $\mu$m by means of, for example, sputtering so as to coat the overall surface. For instance, a magnetic material (e.g., iron nitride) having a higher saturation magnetic flux density than a saturation magnetic flux density of a magnetic material (e.g., an iron-nickel-cobalt alloy) for constituting a top magnetic layer 16C to be formed in the following step is used as a material of the basic magnetic layer 116. Besides iron nitride, for example, an amorphous alloy or the like such as a cobalt-iron alloy (FeCo), a zirconium-cobalt-iron alloy oxide (FeCoZrO) or a zirconium-iron alloy nitride (FeZrN), which has a high saturation magnetic flux density similarly to iron nitride, may be used as the material of the basic magnetic layer 116.

Next, as shown in FIGS. 3A, 3B, 9 and 13, masks 81A, 81B and 81C are selectively formed at predetermined positions on the basic magnetic layer 116. The mask 81A is formed so that a region where the mask 81A is formed includes a region where a second pole tip portion 16A is to be formed in the following step. More specifically, for example, the mask 81A is positioned so that a position of a rear edge of the mask 81A is located rearward by about 0.5 $\mu$m or less with respect to the position of the rear edge of the MR film 6, and the mask 81A is dimensioned so that a width W1 of the mask 81A is much greater than a width W2 of the second pole tip portion 16A to be described later (see FIGS. 6B and 12). The mask 81B is formed so that a region where the mask 81B is formed corresponds to a region where a magnetic path connecting portion 16B is to be formed in the following step, and the mask 81C is formed so that a region where the mask 81C is formed corresponds to a region where the coil connecting portion 16S is to be formed in the following step. The position of the rear edge of the mask 81A is not necessarily located rearward with respect to the position of the rear edge of the MR film 6, and the position of the rear edge of the mask 81A may be matched to the position of the rear edge of the MR film 6. A material of the masks 81A, 81B and 81C, a method of forming these masks and the like are substantially the same as those of the above-mentioned masks 80A and 80B, for example.

Figures 4A, 4B:
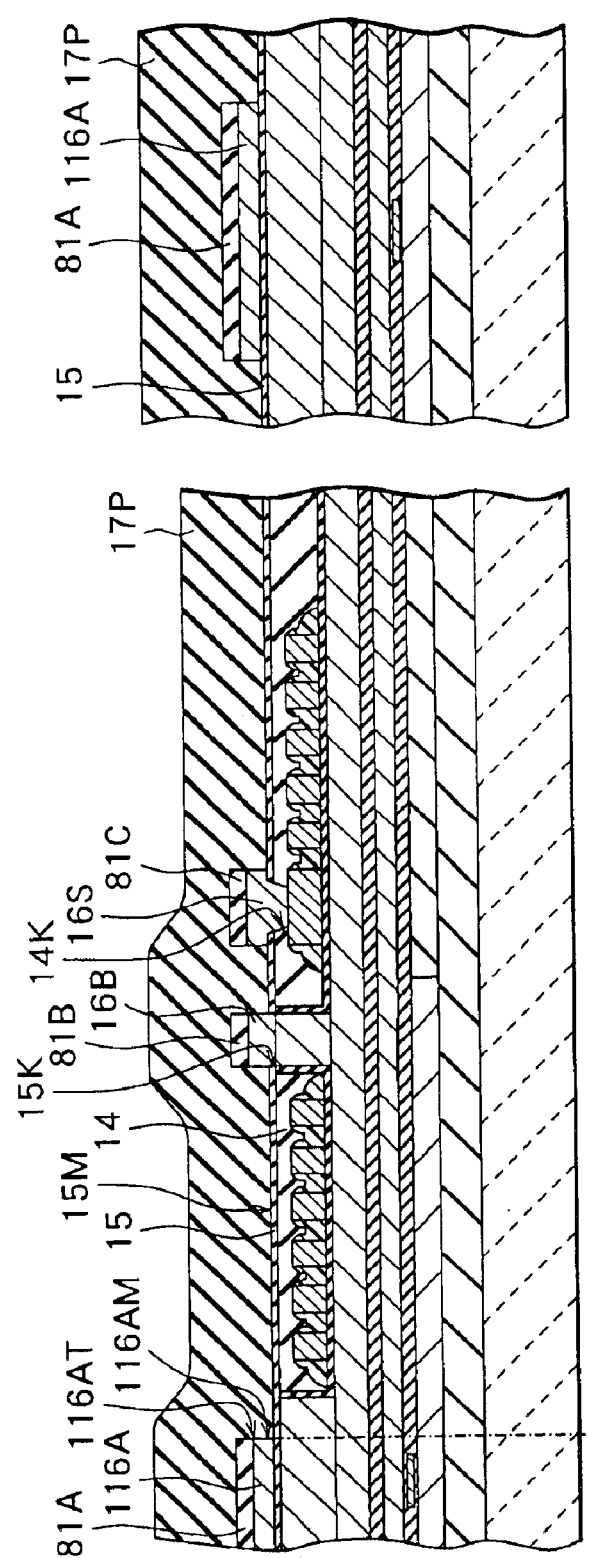
FIGS. 4A and 4B are cross sectional views for describing a step following the step of FIGS. 3A and 3B.

Next, the basic magnetic layer 116 is etched and patterned by means of, for example, RIE using the masks 81A, 81B and 81C. By this etching process, the basic magnetic layer 116 is selectively removed except for the regions where the masks 81A, 81B and 81C are formed. Thus, as shown in FIGS. 4A, 4B and 10, a top precursory magnetic layer 116A is selectively formed on a frontward region on the write gap layer 15, the magnetic path connecting portion 16B for constituting a part of the top pole 16 is selectively formed on the opening 15K, and the coil connecting portion 16S is formed in the opening 14K. The top precursory magnetic layer 116A is formed so that an edge 116AT, extending in the width direction, of a rear edge portion of the layer 116A forms a straight line. In particular, when RIE is used as a method for etching the basic magnetic layer 116, a rear edge surface 116AM of the formed top precursory magnetic layer 116A forms a flat surface and is perpendicular to a flat surface 15M of the write gap layer 15. The use of RIE as an etching method allows forming the top precursory magnetic layer 116A and so on with higher accuracy in a shorter time. The masks 81A, 81B and 81C in themselves are also etched by the etching process for forming the top precursory magnetic layer 116A, so that the thicknesses of the masks 81A, 81B and 81C decrease. At the time of completion of the etching process, the masks 81A, 81B and 81C may remain (see FIGS. 4A, 4B and 10) or do not have to remain. In the embodiment, a portion of the write gap layer 15, which is located frontward with respect to a position P1 (a first position) of a rear edge of the top precursory magnetic layer 116A, corresponds to a specific example of "a gap layer" of the invention, and the top precursory magnetic layer 116A corresponds to a specific example of "a precursory magnetic layer" of the invention.

Next, as shown in FIGS. 4A and 4B, a second precursory insulating layer 17P made of, for example, alumina is formed with a thickness of about 0.8 $\mu$m to 2.0 $\mu$m so as to coat the overall surface.

Figures 5A, 5B:
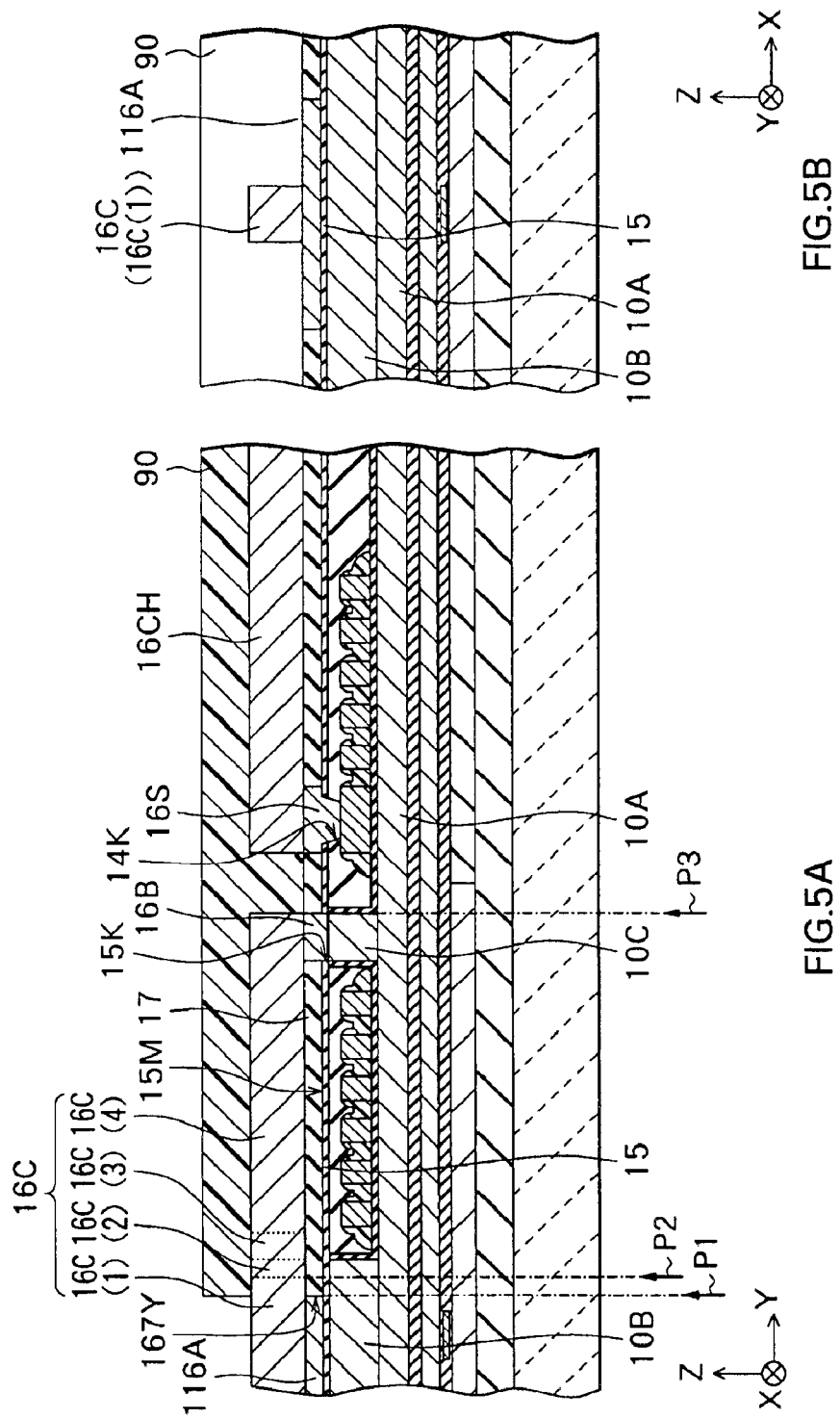
FIGS. 5A and 5B are cross sectional views for describing a step following the step of FIGS. 4A and 4B.

Next, the overall surface of the second precursory insulating layer 17P is polished and flattened by means of CMP, for example. By this polishing, an insulating film 17 for coating a peripheral region around the top precursory magnetic layer 116A, the magnetic path connecting portion 16B and the coil connecting portion 16S is formed as shown in FIG. 5A. The polishing for forming the insulating film 17 takes place so as to expose the top precursory magnetic layer 116A, the magnetic path connecting portion 16B and the coil connecting portion 16S. A boundary surface 167Y between the top precursory magnetic layer 116A and the insulating film 17 forms a flat surface and is perpendicular to the flat surface 15M of the write gap layer 15. A position of a front edge of the insulating film 17 is the reference position for determining a throat height (TH) that is one of factors that determine the performance of the recording head, namely, a throat height zero position (a TH0 position). In the embodiment, a portion of the write gap layer 15, which is located rearward with respect to the position P1 (the first position) of the rear edge of the top precursory magnetic layer 116A, and the insulating film 17 collectively correspond to a specific example of "a second insulating layer portion" of the invention.

Figure 11:
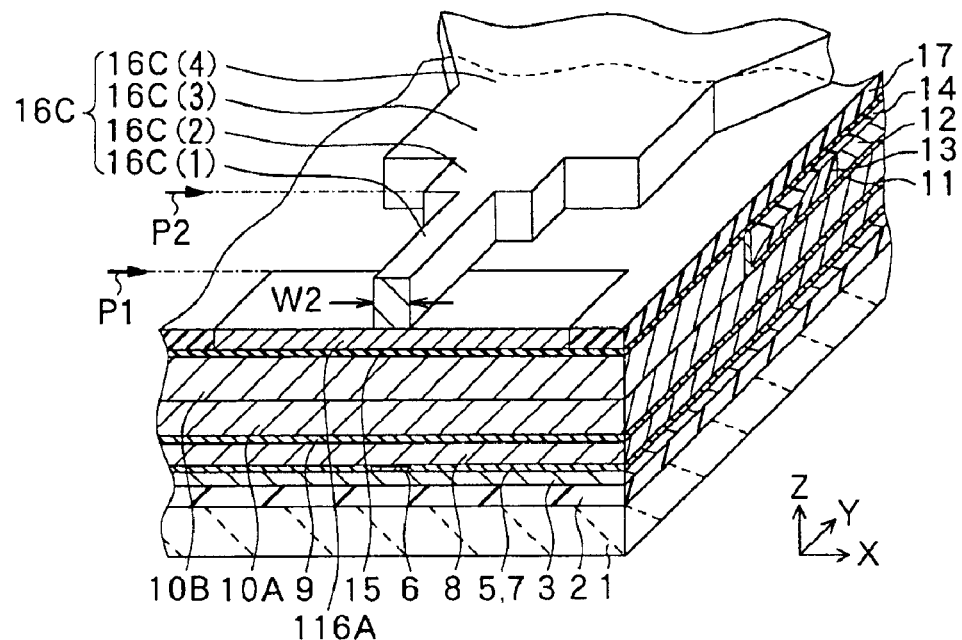
FIG. 11 is a perspective view corresponding to the cross sectional views shown in FIGS. 5A and 5B.

Next, as shown in FIGS. 5A, 5B and 11, the top magnetic layer 16C made of a magnetic material containing iron (Fe), nickel (Ni) and cobalt (Co) and having a high saturation magnetic flux density, e.g., an iron-nickel-cobalt alloy (CoNiFe, Co: 45 wt %, Ni: 30 wt %, Fe: 25 wt %), is selectively formed with a thickness of about 2.0 $\mu$m to 3.0 $\mu$m on a flat region extending from on the top precursory magnetic layer 116A to on the magnetic path connecting portion 16B by means of frame plating, for example. At the same time when the top magnetic layer 16C is formed, a coil connecting wiring 16CH is selectively formed on a region extending from on the coil connecting portion 16S to an external circuit (not shown). The top magnetic layer 16C constitutes a part of the top pole 16. A material containing at least one of chromium (Cr), boron (B), gold (Au) and copper, as well as the above-mentioned three metallic elements, may be used as a material of the top magnetic layer 16C and the coil connecting wiring 16CH.

The top magnetic layer 16C is formed so as to have a planar shape shown in FIG. 14 to be described later, for example, and so as to include a first pole tip portion 16C(1), a middle portion 16C(2), a rear end portion 16C(3) and a yoke portion 16C(4), which are arranged in this order when viewed at the side to form the air bearing surface 70 in the following step (the left side in FIG. 5A). The first pole tip portion 16C(1) is formed so as to have a uniform width (about 0.1 $\mu$m to 0.2 $\mu$m) that defines a write track width on a recording medium. Moreover, these portions are positioned so that a coupling position P2 (a second position) between the first pole tip portion 16C(1) and the middle portion 16C(2) is located rearward with respect to the position P1 (the first position) of the rear edge of the top precursory magnetic layer 116A and, for example, so that a position P3 (a third position) of a rear edge of the yoke portion 16C(4) matches a position of a rear edge of the magnetic path connecting portion 16B. Structural features of the top magnetic layer 16C will be described later.

In the embodiment, the first pole tip portion 16C(1) corresponds to a specific example of "a uniform width portion" of the invention, and the middle portion 16C(2), the rear end portion 16C(3) and the yoke portion 16C(4) collectively correspond to a specific example of "a wide portion" of the invention. The top magnetic layer 16C corresponds to a specific example of "a first magnetic layer portion" of the invention.

The top magnetic layer 16C is formed by means of frame plating in the following manner. First, an electrode film (not shown) for functioning as a seed layer for electroplating is formed with a thickness of about 70 μm by means of sputtering, for example. For instance, an iron-nickel-cobalt alloy (Co: 45 wt %, Ni: 30 wt %, Fe: 25 wt %) or the like having a high saturation magnetic flux density is used as a material of the electrode film. Then, the electrode film is coated with, for example, a positive photoresist (hereinafter referred to as "a photoresist"), and thus a photoresist film (not shown) is formed. Then, a predetermined region of the photoresist film is selectively exposed to light by use of a mask (not shown) having a predetermined shape pattern. Then, a frame pattern (an outer frame) (not shown) for use in plating by means of frame plating is formed through the development of the exposed region of the photoresist film. The frame pattern has an opening corresponding to the above-mentioned exposed region. Then, the top magnetic layer 16C made of an iron-nickel-cobalt alloy (Co: 45 wt %, Ni: 30 wt %, Fe: 25 wt %) is formed by means of electroplating using the frame pattern as a mask and using as the seed layer the electrode film formed in the preceding step. Finally, the frame pattern is removed. The coil connecting wiring 16CH is formed by using the same material and method as the above-described material and method for forming the top magnetic layer 16C.

Next, as shown in FIGS. 5A and 5B, a photoresist film 90 is selectively formed so as to coat, for example, a region located rearward with respect to the position P1 (the first position) of the rear edge of the top precursory magnetic layer 116A.

Next, the top precursory magnetic layer 116A and a peripheral region around the layer 116A are selectively etched by means of, for example, RIE using both the top magnetic layer 16C and the photoresist film 90 as a mask. This etching process selectively removes the top precursory magnetic layer 116A except for a portion corresponding to the first pole tip portion 16C(1) of the top magnetic layer 16C, thereby forming the second pole tip portion 16A for constituting a part of the top pole 16 as shown in FIGS. 6A, 6B and 12. The use of RIE as an etching method allows forming the second pole tip portion 16A with higher accuracy in a shorter time. The second pole tip portion 16A has the uniform width W2 that defines the write track width on the recording medium, in the same manner as the first pole tip portion 16C(1) of the top magnetic layer 16C. The mask in itself, i.e., the top magnetic layer 16C and the photoresist film 90 in themselves, is also etched by the etching process, so that a film thickness of the mask decreases. The photoresist film 90 is also etched in its frontward portion by this etching process, so that a position of its front edge shifts rearward. A rearward portion of the top magnetic layer 16C is magnetically coupled to the bottom magnetic layers 10A and 10B with the magnetic path connecting portion 16B and the bottom connecting portion 10C in between in the opening 15K, and a frontward portion of the top magnetic layer 16C is magnetically coupled to the second pole tip portion 16A. That is, the top pole 16 (the second pole tip portion 16A, the magnetic path connecting portion 16B and the top magnetic layer 16C) is connected to the bottom pole 10 (the bottom magnetic layers 10A and 10B and the bottom connecting portion 10C), and thus a magnetic path is formed. In the embodiment, the second pole tip portion 16A corresponds to a specific example of "a second magnetic layer portion" of the invention, and the top pole 16 comprising the second pole tip portion 16A, the magnetic path connecting portion 16B and the top magnetic layer 16C corresponds to a specific example of "a first magnetic layer" of the invention.

For the etching process using RIE for forming the second pole tip portion 16A, for example, it is particularly preferable that an etching gas containing at least one of chlorine ($Cl_2$), boron trichloride ($BCl_3$), hydrogen chloride (HCl), carbon tetrafluoride ($CF_4$), sulfur hexafluoride ($SF_6$) and boron tribromide ($BBr_3$) and an additive such as hydrogen ($H_2$), oxygen ($O_2$), nitrogen ($N_2$) or argon (Ar) be used and that the processing temperature lie between 50 and 300 degrees Celsius inclusive. The etching process using RIE at such a temperature in such a gaseous atmosphere allows accelerating a chemical reaction of the etching process for, in particular, the top precursory magnetic layer 116A made of iron nitride (see FIGS. 5A and 5B), and therefore permits a still shorter time required for forming the second pole tip portion 16A.

Furthermore, the overall surface is etched by about 0.3 μm to 0.4 μm by means of, for example, RIE using the top magnetic layer 16C and the photoresist film 90 as the mask. This etching process selectively removes the respective parts of the write gap layer 15, the bottom magnetic layer 10B and the insulating film 17 around the second pole tip portion 16A, thereby forming a pole portion 100 having a trim structure as shown in FIGS. 6B and 12. For example, the pole portion 100 is formed so that the position of the front edge of the photoresist film 90 matches the coupling position P2 between the first pole tip portion 16C(1) and the middle portion 16C(2) of the top magnetic layer 16C. The pole portion 100 comprises the first pole tip portion 16C(1) of the top magnetic layer 16C, the second pole tip portion 16A, a portion of the write gap layer 15, and a portion of the bottom magnetic layer 10B corresponding to the second pole tip portion 16A and so on. The above-mentioned portions constituting the pole portion 100 have substantially the same width. The use of RIE as an etching method allows forming the pole portion 100 with higher accuracy in a shorter time.

For the etching process using RIE for forming the pole portion 100, for example, it is particularly preferable that a mixed gas of chlorine and boron trichloride be used as an etching gas and that the processing temperature lie between 100 and 200 degrees Celsius inclusive. The etching process using RIE at such a temperature in such a gaseous atmosphere allows a still shorter time required for forming the pole portion 100.

Next, after removing the photoresist film 90, as shown in FIGS. 7A and 7B, an overcoat layer 18 made of an insulating material, e.g., an inorganic insulating material such as alumina, is formed with a thickness of about 20 μm to 40 μm so as to coat the overall surface.

Figures 8A, 8B:
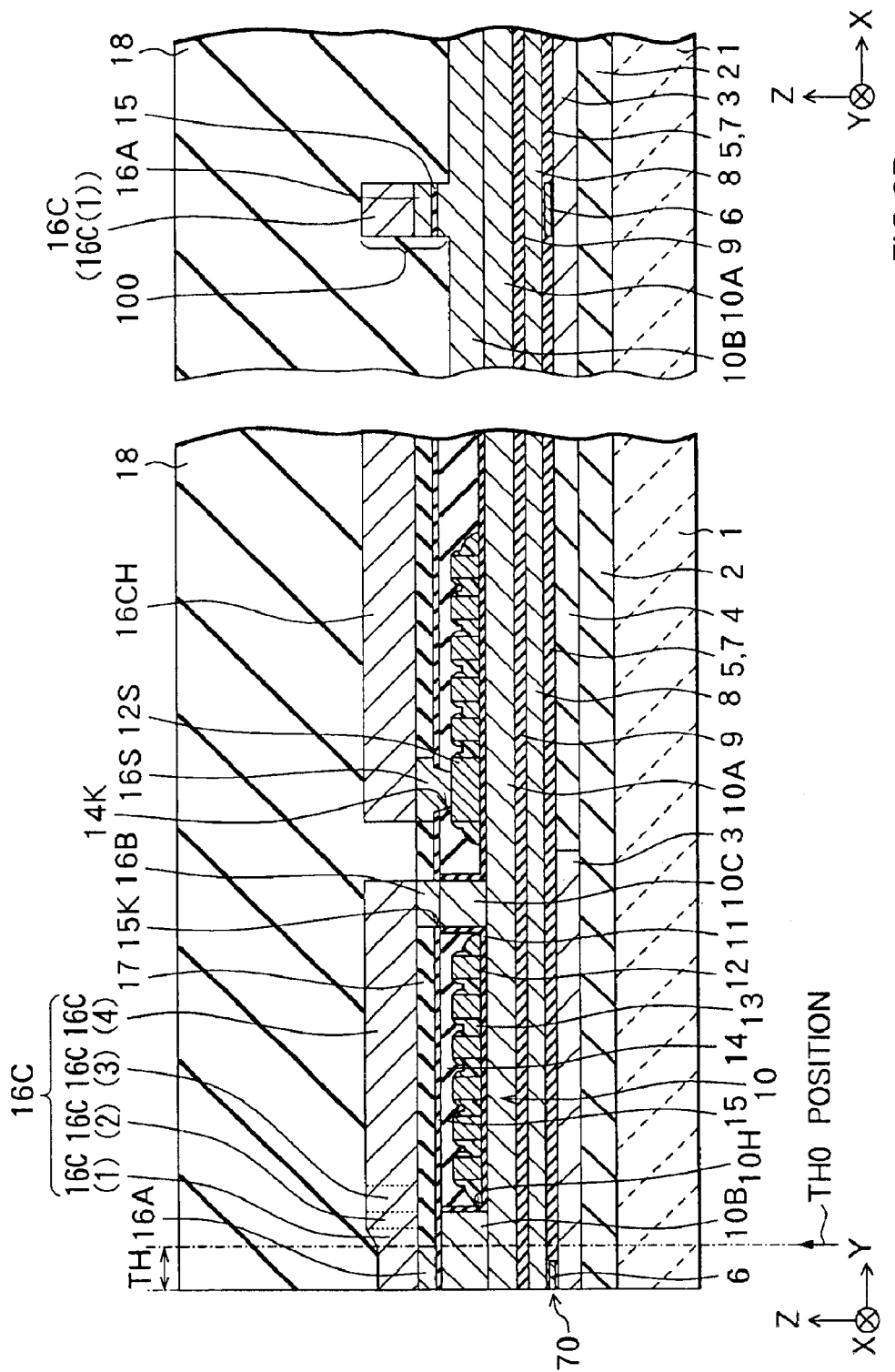
FIGS. 8A and 8B are cross sectional views for describing a step following the step of FIGS. 7A and 7B.

Finally, as shown in FIGS. 8A and 8B, the air bearing surface 70 of the recording head and the reproducing head is formed through the steps of machining and polishing, and thus a thin film magnetic head is completed.

<Structure of Thin Film Magnetic Head>

Next, the planar structure of the thin film magnetic head according to the embodiment will be described with reference to FIG. 14.

Figure 14:
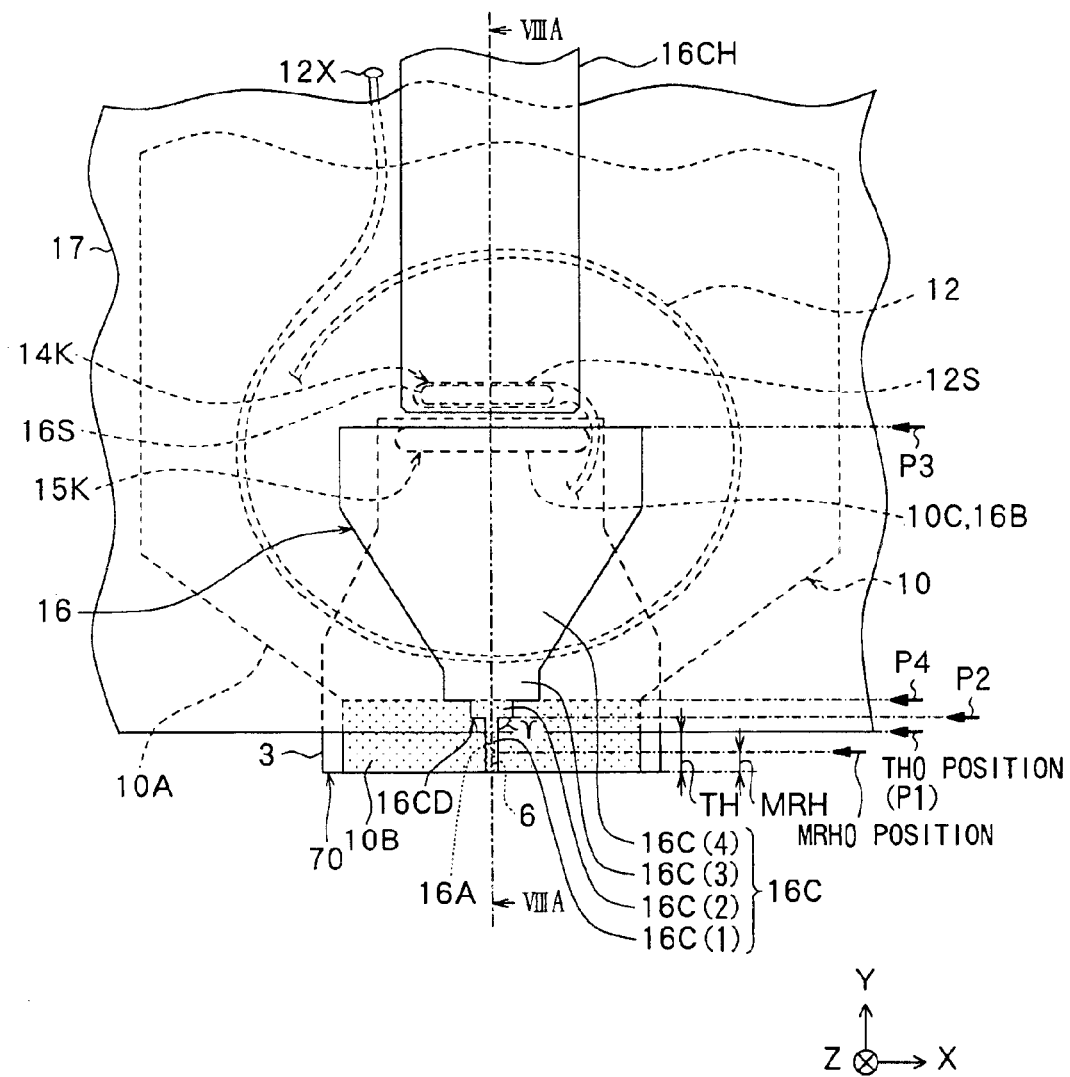
FIG. 14 is a plan view showing a planar structure of a thin film magnetic head according to the first embodiment of the invention.

FIG. 14 shows a schematic representation of the planar structure of the thin film magnetic head manufactured by the method of manufacturing a thin film magnetic head according to the embodiment. FIG. 14 does not show the insulating films 11, 13 and 14, the overcoat layer 18 and so on. The thin film coil 12, only a part of its outermost periphery, is shown in FIG. 14. FIG. 8A corresponds to a cross section viewed in the direction of the arrows along the line VIIIA—VIIIA of FIG. 14. The expressions of the X-axis, Y-axis and Z-axis directions in FIG. 14 are the same as the expressions thereof in FIGS. 1A and 1B to FIG. 13.

The position of the front edge of the insulating film 17 (the position P1 of the rear edge of the second pole tip portion 16A) is the reference position for determining the throat height (TH), namely, the throat height zero position (the TH0 position). The throat height (TH) is defined as a length between the position (the TH0 position) of the front edge of the insulating film 17 and the air bearing surface 70. "An MRH0 position" in FIG. 14 represents the position of the rear edge of the MR film 6, namely, an MR height zero position. An MR height (MRH) corresponds to a length between the MR height zero position and the air bearing surface 70. For example, the throat height zero position (the TH0 position) substantially matches the MR height zero position (the MRH0 position).

As described above, for example, the bottom pole 10 comprises the bottom magnetic layers 10A and 10B and the bottom connecting portion 10C, which are separately formed. The bottom magnetic layer 10B widely extends in the width direction over a region extending from the air bearing surface 70 to the position P4.

As described above, for example, the top pole 16 comprises the second pole tip portion 16A, the magnetic path connecting portion 16B and the top magnetic layer 16C, which are separately formed.

For example, the second pole tip portion 16A has a rectangular planar shape and has a uniform width throughout the portion 16A. As described above, the top magnetic layer 16C includes the first pole tip portion 16C(1), the middle portion 16C(2), the rear end portion 16C(3) and the yoke portion 16G(4), which are arranged in this order when viewed at the side of the air bearing surface 70. Of these portions, the first pole tip portion 16C(1), the middle portion 16C(2) and the rear end portion 16C(3) have a rectangular planar shape, for example. The first pole tip portion 16C(1) has the same uniform width as the width of the second pole tip portion 16A and has a greater length than a length of the second pole tip portion 16A. The middle portion 16C(2) has a greater width than the width of the first pole tip portion 16C(1), for example, and the rear end portion 16C(3) has a greater width than the width of the middle portion 16C(2), for example. That is, a coupling portion between the first pole tip portion 16C(1) and the middle portion 16C(2) is stepped in the width direction. The yoke portion 16C(4) functions to contain a magnetic flux generated by the thin film coil 12 and has a greater width than the width of the rear end portion 16C(3). For example, the width of the yoke portion 16C(4) is substantially uniform in the rearward portion thereof and is gradually narrower in the frontward portion thereof at a position closer to the air bearing surface 70. The centers of the portions constituting the top magnetic layer 16C in the width direction match one another.

An angle γ of a corner portion, at which a step surface 16CD of the stepped coupling portion between the first pole tip portion 16C(1) and the middle portion 16C(2) crosses a side edge surface of the first pole tip portion 16C(1), is equal to 90 degrees Celsius, for example. The angle γ of the corner portion is not necessarily limited to 90 degrees Celsius. Preferably, the angle γ lies between, for example, 90 and 120 degrees Celsius inclusive, because the angle γ within the above-mentioned range allows smoothing the flow of a magnetic flux from the middle portion 16C(2) into the first pole tip portion 16C(1).

As described above, the thin film coil 12 has an extremely small winding structure. Both the terminal 12X constituting the outer terminal end of the thin film coil 12 and a rear end portion of a coil connecting wiring 12CH are connected to an external circuit (not shown) so that the external circuit can feed a current through the thin film coil 12.

<Operation of Thin Film Magnetic Head>

The thin film magnetic head operates in the following manner. In the recording operation of information, the external circuit (not shown) feeds a current through the thin film coil 12, and thus the thin film coil 12 generates a magnetic flux according to the current. The generated magnetic flux mainly propagates through the top magnetic layer 16C from the yoke portion 16C(4) to the first pole tip portion 16C(1), and then reaches to a tip portion of the first pole tip portion 16C(1) close to the air bearing surface 70. After reaching to the tip portion of the first pole tip portion 16C(1), the magnetic flux generates a signal magnetic field for recording to the outside near the write gap layer 15. The signal magnetic field partly magnetizes a magnetic recording medium, thereby enabling information to be recorded on the magnetic recording medium.

In the reproducing operation, a sense current is fed through the MR film 6 of the reproducing head. Since the resistance of the MR film 6 changes according to a reproducing signal magnetic field from the magnetic recording medium, information recorded on the magnetic recording medium can be read out by detecting the resistance change according to a change in the sense current.

<Advantages of First Embodiment>

In the thin film magnetic head of the embodiment, as shown in FIG. 8A, the thin film coil 12 is coated with the insulating films 11, 13 and 14 in the recess region 10H provided in the bottom pole 10, namely, a rearward region corresponding to the thickness of the bottom magnetic layer 10B. Therefore, the thin film magnetic head of the embodiment can ensure superior overwrite characteristics, while having a uniform width of the second pole tip portion 16A with high accuracy, even when each winding of the thin film coil 12 has an extremely small width. The reason is as follows. As described above, each winding of the thin film coil 12 has an extremely small width (about 0.5 μm) for the purpose of size reduction of the thin film magnetic head, or the like. In this case, in order to obtain superior overwrite characteristics, it is necessary to appropriately ensure a cross-sectional area thickness of the thin film coil 12 (e.g., 0.8 μm or more) so as to ensure the cross-sectional area thickness of the thin film coil 12.

Figures 15A, 15B:
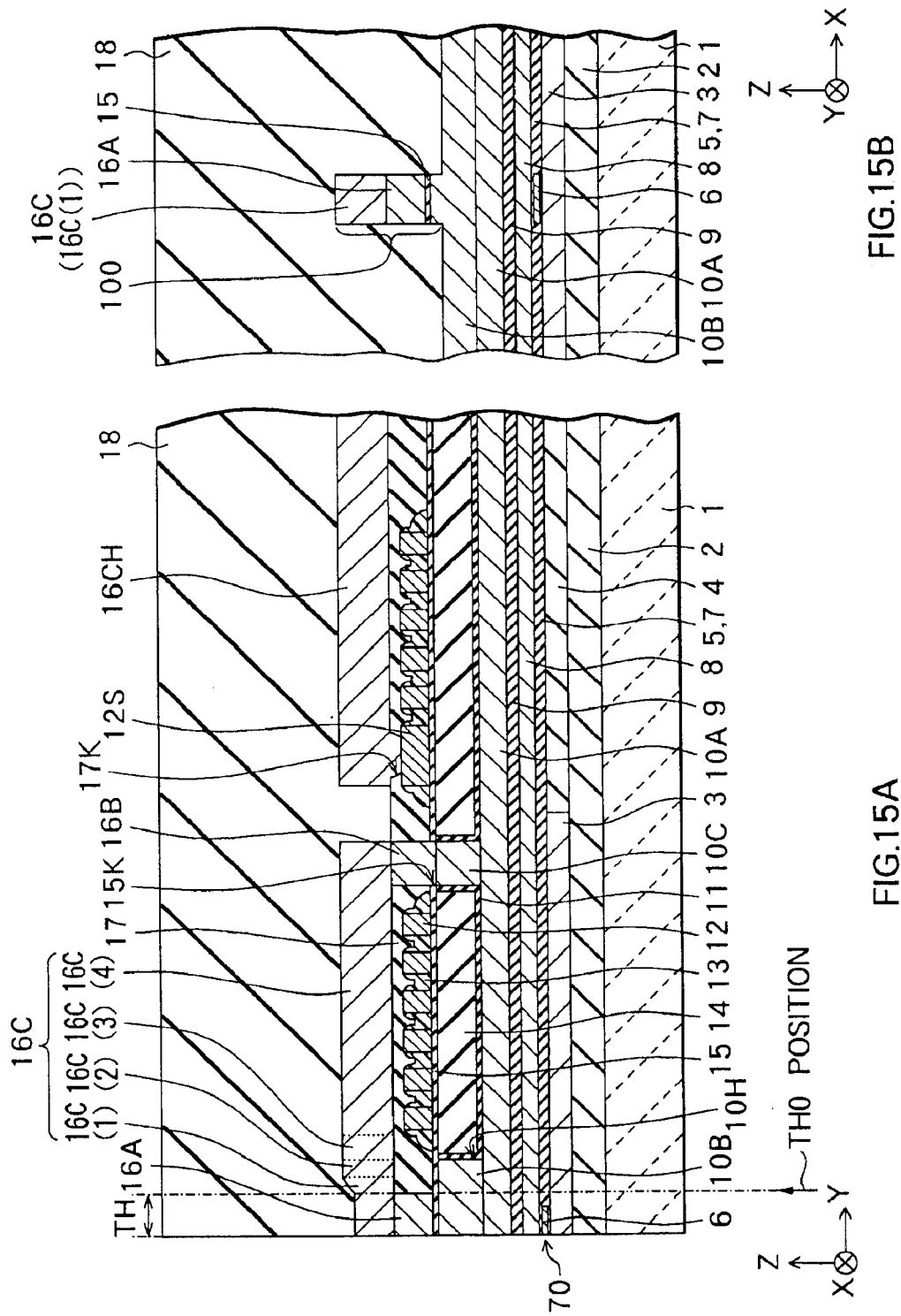
FIGS. 15A and 15B are cross sectional views showing a sectional structure of a thin film magnetic head in which a thin film coil is provided at a changed position.

When the thin film coil 12 and the like are coated with the insulating film 17 in a region other than the rearward region (the recess region 10H) corresponding to the thickness of the bottom magnetic layer 10B, e.g., a rearward region corresponding to the thickness of the second pole tip portion 16A, the second pole tip portion 16A must have a greater thickness (e.g., 1.0 μm or more) than the thickness described in the above-mentioned section "Method of manufacturing thin film magnetic head" as shown in FIGS. 15A and 15B, in order that the thin film coil 12 may have an appropriate thickness (e.g., 0.8 μm or more) and the insulating film 17 having a sufficient thickness may be ensured on the thin film coil 12. However, a greater thickness of the second pole tip portion 16A makes it difficult to make the width thereof uniform with high accuracy. The reason is as follows: that is, when a thickness of the top precursory magnetic layer 116A is increased in order to increase the thickness of the second pole tip portion 16A, the amount of residues produced by etching increases as the etching process for the top precursory magnetic layer 116A proceeds, and the width of the second pole tip portion 16A substantially increases due to the phenomenon of redeposition of the residues produced by etching. In the case of the thin film magnetic head shown in FIGS. 15A and 15B, a less thickness of the second pole tip portion 16A (e.g., 0.5 μm to 0.6 μm) causes the thickness of the thin film coil 12 to become less than the thickness of the second pole tip portion 16A. Too small a thickness of the thin film coil 12 brings too high an electrical resistance value of the thin film coil 12 and thus causes a reduction in the amount of current passing through the thin film coil 12, so that this leads to a reduction in the amount of generated magnetic flux. The reduction in the amount of generated magnetic flux results in deterioration in the overwrite characteristics.

In the embodiment, the thin film coil 12 is provided in the rearward region (the recess region 10H) corresponding to the thickness of the bottom magnetic layer 10B, and therefore the thickness of the second pole tip portion 16A does not depend on the thickness of the thin film coil 12. In other words, an appropriate reduction in the thickness of the second pole tip portion 16A allows reducing an adverse influence resulting from the above-mentioned phenomenon of redeposition of the residues produced by etching, and thus allows making the width of the second pole tip portion 16A uniform with high accuracy. Moreover, the thickness of the thin film coil 12 is sufficiently ensured, and therefore the thin film coil 12 generates a sufficient amount of magnetic flux, so that superior overwrite characteristics are ensured. The bottom magnetic layer 10B has a greater width as distinct from the second pole tip portion 16A having an extremely small width, and therefore it is possible that a disadvantage caused by the thickness of the second pole tip portion 16A and the accuracy in forming the portion 16A becomes insignificant in forming the bottom magnetic layer 10B.

Moreover, in the embodiment, a portion having a uniform width for defining the write track width on the recording medium has a two-layer structure (the second pole tip portion 16A and the first pole tip portion 16C(1)), and therefore the position (the TH0 position) of the front edge of the insulating film 17 is changed by changing only the length of the second pole tip portion 16A without changing the structure of the top magnetic layer 16C constituting a main propagation path of a magnetic flux. Therefore, the throat height (TH) that is one of factors that determine the performance of the recording head can be easily adjusted.

Furthermore, an iron-nickel-cobalt alloy is used as a material of a top layer portion (the first pole tip portion 16C(1)) of the aforementioned two-layer structure, and nickel iron is used as a material of a bottom layer portion (the second pole tip portion 16A) of the two-layer structure. Therefore, this also contributes to the ensured superior overwrite characteristics for the following reason. That is, the iron-nickel-cobalt alloy to be used as the material of the first pole tip portion 16C(1) can be used as an etching mask because of its properties of high hardness as described above, whereas the iron-nickel-cobalt alloy is difficult to control its composition for plating. Insufficient control of the composition may cause the occurrence of variations in magnetic flux density in part in the iron-nickel-cobalt alloy and thus cause the occurrence of variations in characteristics of propagation of magnetic flux. On the other hand, the composition of the nickel iron to be used as the material of the second pole tip portion 16A can be controlled with relative ease by using sputtering as a method of forming the second pole tip portion 16A. Therefore, even if the composition of the iron-nickel-cobalt alloy somewhat varies and thus variations occur in the characteristics of propagation of magnetic flux through the first pole tip portion 16C(1), the second pole tip portion 16A made of the nickel iron having the properly controlled composition ensures that a magnetic flux smoothly propagates through the second pole tip portion 16A, so that a sufficient magnetic flux reaches to a tip portion of the second pole tip portion 16A. The above-mentioned advantage becomes marked, particularly when a magnetic material having a higher saturation magnetic flux density than a saturation magnetic flux density of a magnetic material (an iron-nickel-cobalt alloy) for constituting the top magnetic layer 16C is used as a magnetic material (iron nitride) for constituting the second pole tip portion 16A.

Moreover, in the embodiment, the widths of the yoke portion 16C(4), the rear end portion 16C(3), the middle portion 16C(2) and the first pole tip portion 16C(1), which constitute the top magnetic layer 16C, decrease in this order, so that the magnetic volumes of the portions 16C(4), 16C(3), 16C(2) and 16C(1), namely, the allowable amounts of magnetic flux that can be contained in these portions, also decrease in the same order. In this case, after flowing into the top magnetic layer 16C, a magnetic flux gradually converges according to a gradual decrease in the magnetic volume in the process of propagation of the magnetic flux from the yoke portion 16C(4) to the first pole tip portion 16C(1), and therefore the phenomenon of saturation of magnetic flux is prevented in the process of propagation of magnetic flux. Accordingly, a sufficient amount of magnetic flux is supplied to the first pole tip portion 16C(1) and the second pole tip portion 16A, and therefore this also contributes to the ensured superior overwrite characteristics.

Moreover, in the embodiment, magnetic materials having a high saturation magnetic flux density (e.g., iron nitride and an iron-nickel-cobalt alloy) are used as both materials of the second pole tip portion 16A and the top magnetic layer 16C. Even when a pole width is made extremely small in order to increase a recording density, the phenomenon of saturation of magnetic flux is therefore prevented, so that the propagation of magnetic flux becomes smoothed. Accordingly, a sufficient amount of magnetic flux is supplied to the respective tip portions of the second pole tip portion 16A and the first pole tip portion 16C(1) of the top magnetic layer 16C which have a low magnetic volume, and therefore this also contributes to the ensured superior overwrite characteristics.

In the method of manufacturing a thin film magnetic head of the embodiment, the second pole tip portion 16A is formed as a part of the top precursory magnetic layer 116A (see FIGS. 4A and 10) which is formed so that the rear edge 116AT, extending in the width direction, of the rear edge portion of the layer 116A forms the straight line, and therefore a part of the rear edge 116AT remains as a part of the second pole tip portion 16A. In this case, the position (the throat height zero position) of the front edge of the insulating film 17 can be uniquely determined at the position of the rear edge of the second pole tip portion 16A.

Moreover, in the embodiment, RIE is used as a method for etching the basic magnetic layer 116 in particular, and therefore an etched edge surface (the rear edge surface 116AM) of the formed top precursory magnetic layer 116A does not become rounded but becomes flattened (see FIGS. 4A and 10). More particularly, etching takes place so that the etched edge surface (the rear edge surface 116AM) of the top precursory magnetic layer 116A is perpendicular to the flat surface 15M of the write gap layer 15, and thus a rear edge surface 16AM (see FIGS. 7A and 12) of the second pole tip portion 16A formed as a part of the top precursory magnetic layer 116A also becomes flattened and becomes perpendicular to the flat surface 15M of the write gap layer 15. In this case, it becomes easier to determine the above-mentioned throat height zero position.

Furthermore, the use of RIE as an etching method allows forming the top precursory magnetic layer 116A with higher accuracy in a shorter time, as compared to the use of ion milling. The advantages of improving the forming accuracy and reducing the forming time, which are obtained when RIE is used as the etching method, hold true for the formation of the second pole tip portion 16A, the bottom magnetic layer 10B, the bottom connecting portion 10C, the pole portion 100 and so forth. More particularly, the etching process using RIE is performed under the right etching conditions, and thus the time required for forming the top precursory magnetic layer 116A and so on can become still shorter.

Moreover, in the embodiment, the top magnetic layer 16C is formed on the flat surface of the write gap layer 15, and therefore the top magnetic layer 16C can be formed with high accuracy, as distinct from the top magnetic layer 16C formed on an underlayer having an uneven structure. The reason is as follows. In the case of an underlayer having an uneven structure, even if an attempt is made to selectively expose a photoresist film to light in order to form a photoresist pattern, the uneven underlayer causes an exposed region to increase or decrease in size due to an influence of light reflected from the underlayer in an oblique or transverse direction, and this makes it impossible to form the photoresist pattern with high accuracy. On the other hand, in the case of a flat underlayer, the flat underlayer allows reducing an adverse influence upon the exposure accuracy resulting from the reflected light and therefore permits forming the photoresist pattern with higher accuracy, as compared to the underlayer having the uneven structure.

Moreover, in the embodiment, a magnetic material containing iron, nickel and cobalt, e.g., an iron-nickel-cobalt alloy (CoNiFe), is used as a material of the top magnetic layer 16C. Generally, the etching rate for the iron-nickel-cobalt alloy is lower than the etching rate for Permalloy, iron nitride or the like because the iron-nickel-cobalt alloy is a harder magnetic material than a magnetic material such as Permalloy or nickel iron. Therefore, in the etching process for patterning the basic magnetic layer 116, the amount of etching of the top magnetic layer 16C (the first pole tip portion 16C(1)) can be smaller than the amount of etching of the basic magnetic layer 116, so that a film decrease of the top magnetic layer 16C (the first pole tip portion 16C(1)) can be reduced. To form the top magnetic layer 16C, it is, however, necessary to ensure a necessary and sufficient thickness of the top magnetic layer 16C after allowing for "a film decrease" in the etching process. The amount of etching of the top magnetic layer 16C (the first pole tip portion 16C(1)) (i.e., the amount of film decrease thereof) can be adjusted by changing the etching conditions such as the type of etching gas and the processing temperature.

Preferably, the iron-nickel-cobalt alloy is used as the material of the top magnetic layer 16C only when a film thickness of the top magnetic layer 16C to be formed is appropriately thin (e.g., 3.0 $\mu$m or less). The reason is as follows. For example, when the iron-nickel-cobalt alloy is used as the material so as to form the top magnetic layer 16C having a thickness of more than about 3.0 $\mu$m, the iron-nickel-cobalt alloy partly cracks or delaminates due to storage of internal stress, and this makes it difficult to normally form the top magnetic layer 16C. In the embodiment, the top magnetic layer 16C is formed so as to have a thickness of about 2.0 $\mu$m to 3.0 $\mu$m, and therefore, even when a hard magnetic material such as the iron-nickel-cobalt alloy is used, the above-mentioned "cracking" or "delamination" or the like can be avoided, so that the top magnetic layer 16C can be formed with stability.

Moreover, in the embodiment, an organic insulating material such as a photoresist exhibiting fluidity during heating is used as a material of the insulating film 13 for filling the gap between the windings of the thin film coil 12 (including the coil connecting portion 12S). Therefore, the insulating film 13 can fill up the gap between the windings of the thin film coil 12 and the like and can thus ensure that the windings are insulated, as distinct from an insulating film made of an inorganic insulating material such as alumina that does not exhibit fluidity during heating.

Moreover, in the embodiment, an inorganic insulating material such as alumina is used as a material of the insulating film 14. Therefore, the insulating film 14 can prevent the occurrence of clogging of a polishing surface of a CMP polishing disc and can form a smoother polished surface, as distinct from an insulating film made of a soft insulating material such as a photoresist.

<Modifications of First Embodiment>

Figure 16:
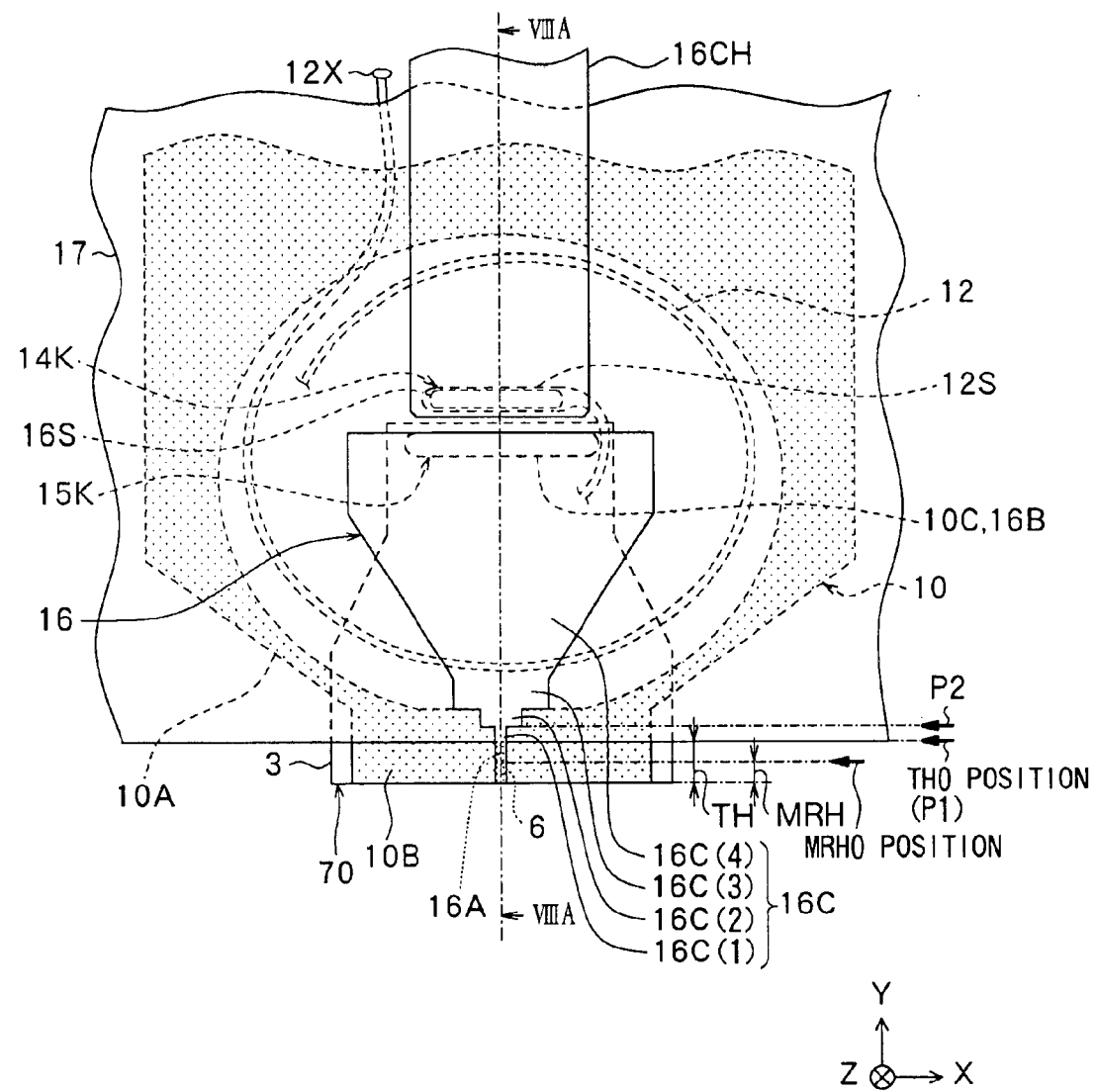
FIG. 16 is a plan view of a structure of a thin film magnetic head according to a modification of the first embodiment of the invention.

In the thin film magnetic head of the embodiment, as shown in FIG. 14, the bottom magnetic layer 10B is provided in a region located frontward with respect to the coupling position P4 between the middle portion 16C(2) and the rear end portion 16C(3) of the top magnetic layer 16C, but the invention is not necessarily limited to this embodiment, and a region where the bottom magnetic layer 10B is to be provided can be optionally changed. For example, as shown in FIG. 16, the bottom magnetic layer 10B may be provided so as to surround the thin film coil 12. Also in this case, about the same advantages as the advantages of the above-described embodiment can be obtained. The structure and the like shown in FIG. 16, except for the above-mentioned respect, are the same as those shown in FIG. 14.

Figures 17A, 17B:
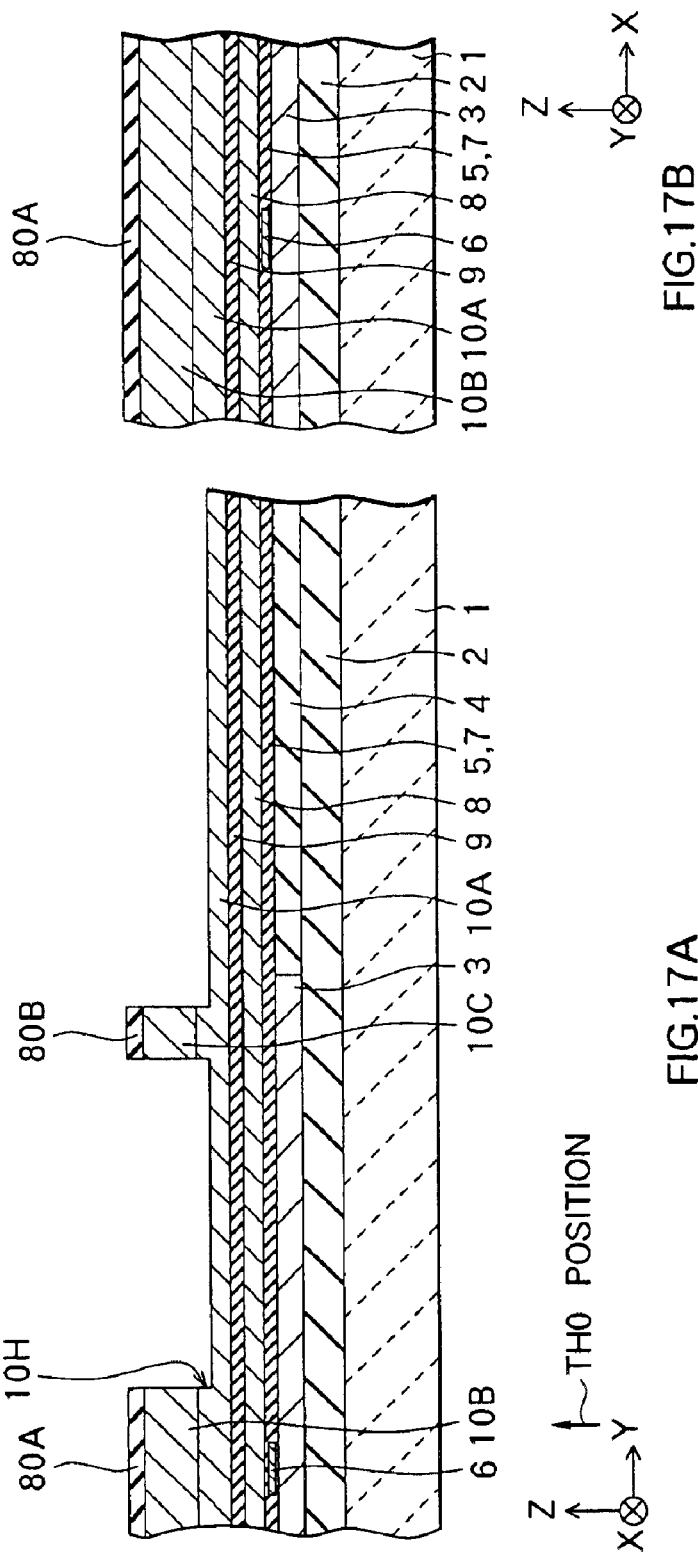
FIGS. 17A and 17B are cross sectional views for describing a step of a method of manufacturing a thin film magnetic head according to a modification of the first embodiment of the invention.
Figures 18A, 18B:
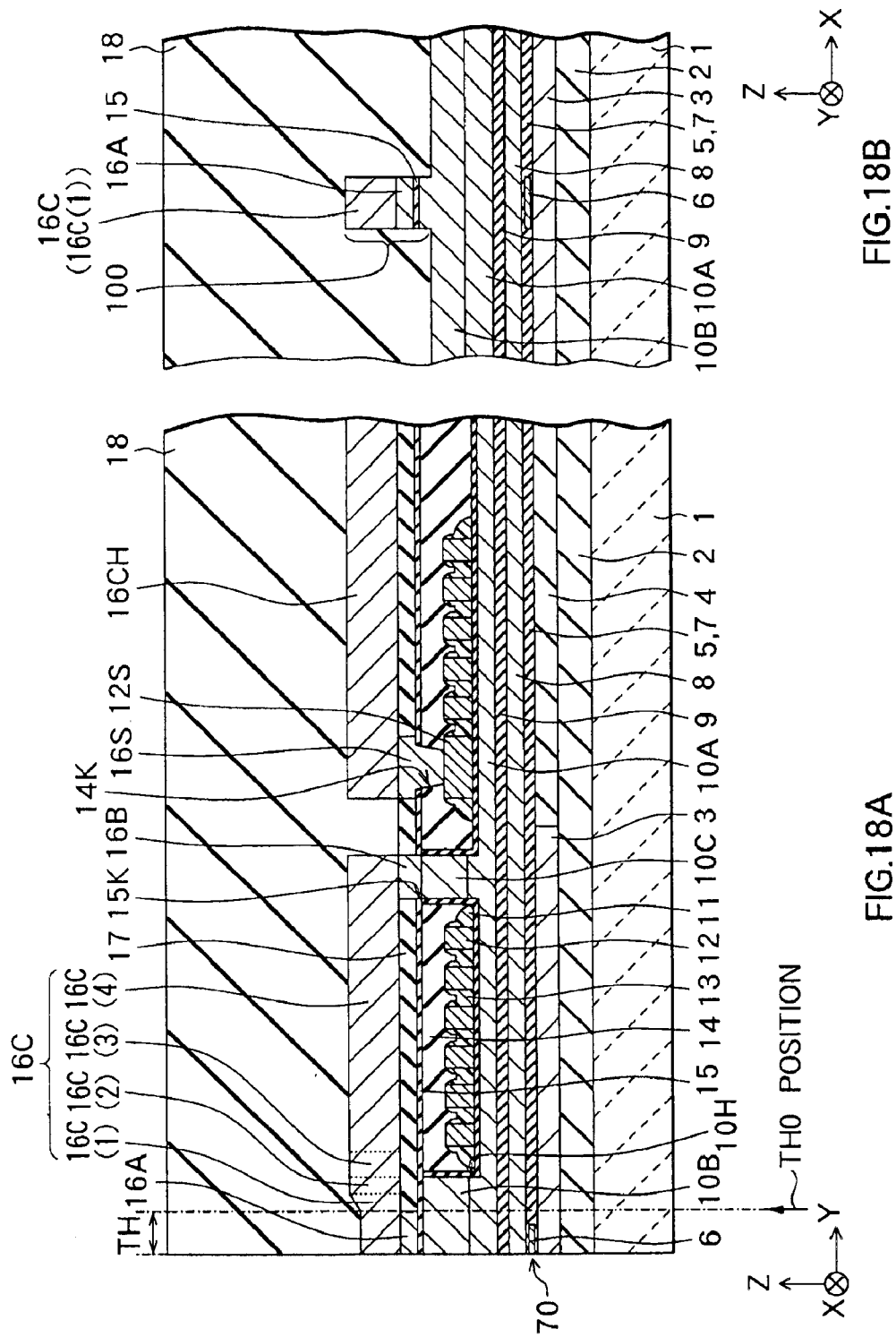
FIGS. 18A and 18B are cross sectional views of a structure of a thin film magnetic head manufactured by the method of manufacturing a thin film magnetic head according to the modification shown in FIGS. 17A and 17B.

In the method of manufacturing a thin film magnetic head of the embodiment, as shown in FIGS. 2A and 2B, the etching step for forming the bottom magnetic layer 10B and so on is adapted to finish the etching process at the time when the bottom magnetic layer 10A is exposed, but the invention is not necessarily limited to this embodiment. For example, as shown in FIGS. 17A and 17B, after forming the bottom magnetic layer 10B and so on, a part of the bottom magnetic layer 10A may be further etched and recessed so as to form the recess region 10H. For example, the recess region 10H is formed so as to have a depth of about 0.5 $\mu$m to 1.5 $\mu$m. After forming the recess region 10H, the insulating film 11, the thin film coil 12 and the like are formed by using the same method as the method of the above-described embodiment, and thus a thin film magnetic head having a structure shown in FIGS. 18A and 18B is completed. FIGS. 18A and 18B correspond to FIGS. 8A and 8B of the above-described embodiment, respectively. In the case where the recess region 10H is formed, the position of the surface of the underlayer on which the thin film coil 12 is to be formed is located lower than the position of the surface of the underlayer on which the thin film coil 12 is to be formed in the case where the recess region 10H is not formed. Thus, a space region for increasing the thickness of the thin film coil 12 is ensured over the thin film coil 12, and therefore, in this case, the thickness of the thin film coil 12 can be still greater than the thickness of the thin film coil 12 of the above-described embodiment.

Furthermore, the position of the surface of the underlayer on which the thin film coil 12 is to be formed is lowered, and thus it becomes possible to reduce the thickness of the bottom magnetic layer 10B, as well as to appropriately ensure a thickness of the insulating film 14 on the thin film coil 12. In this case, the bottom magnetic layer 10B and the like can be formed with higher accuracy by reducing the thickness of the bottom precursory magnetic layer 110, for the same reason as in the case of the correlation between the thickness of the top precursory magnetic layer 116A and the accuracy in forming the second pole tip portion 16A described by referring to the above-mentioned embodiment.

Moreover, in the embodiment, Permalloy is used as a material of the bottom magnetic layer 10A, but the invention is not necessarily limited to this embodiment. For example, iron nitride or an amorphous alloy (e.g., a cobalt-iron alloy) may be used, or an alloy containing iron, nickel and cobalt (e.g., an iron-nickel-cobalt alloy) may be used. Besides the above-mentioned frame plating, for example, patterning of a sputtered film by means of an etching process may be used as a method of forming the bottom magnetic layer 10A, as in the case of the method of forming the bottom magnetic layer 10B and the like.

Moreover, in the embodiment, iron nitride or an amorphous alloy is used as a material of the bottom magnetic layer 10B and the bottom connecting portion 10C, but the invention is not necessarily limited to this embodiment. For example, Permalloy may be used, or an alloy containing iron, nickel and cobalt (e.g., an iron-nickel-cobalt alloy) may be used. Besides the above-mentioned patterning of a sputtered film by means of an etching process, frame plating, for example, may be used as a method of forming the bottom magnetic layer 10B and the bottom connecting portion 10C.

Moreover, in the embodiment, iron nitride or an amorphous alloy (a cobalt-iron alloy or the like) is used as a material of the basic magnetic layer 116 (the second pole tip portion 16A), but the invention is not necessarily limited to this embodiment. For example, Permalloy may be used, or a magnetic material containing iron, nickel and cobalt (e.g., an iron-nickel-cobalt alloy) may be used. To properly control the composition of the basic magnetic layer 116 so as to ensure good characteristics of propagation of magnetic flux through the second pole tip portion 16A to be finally formed, it is preferable that the iron nitride or the amorphous alloy be used as the material of the basic magnetic layer 116. It is not always necessary to use sputtering and etching as a method of forming the basic magnetic layer 116, and, for example, frame plating may be used.

Moreover, in the embodiment, an iron-nickel-cobalt alloy is used as a material of the top magnetic layer 46C, but the invention is not necessarily limited to this embodiment. For example, Permalloy, iron nitride or an amorphous alloy (e.g., a cobalt-iron alloy) may be used. To reduce the amount of film decrease of the top magnetic layer 16C for functioning as a mask for patterning the top precursory magnetic layer 116A, it is preferable that the iron-nickel-cobalt alloy be used as the material of the top magnetic layer 16C as described by referring to the above-mentioned embodiment. Besides the above-mentioned frame plating, for example, patterning of a sputtered film by means of an etching process may be used as a method of forming the top magnetic layer 16C, as in the case of the method of forming the bottom magnetic layer 10B and the like. Also when frame plating is used, the top precursory magnetic layer 116A is, of course, formed so that the edge 116AT, extending in the width direction, of the rear edge portion of the layer 116A forms the straight line.

Moreover, in the embodiment, magnetic materials having a high saturation magnetic flux density are used as both materials of the basic magnetic layer 116 (the second pole tip portion 16A) and the top magnetic layer 16C. In this case, it is possible to optionally set the saturation magnetic flux densities of the magnetic materials to be used for forming the above-mentioned layers 116 (16A) and 16C. More specifically, for example, two types of magnetic materials having an equal saturation magnetic flux density may be used as the materials of the layers 116 (16A) and 16C, or two types of magnetic materials having different saturation magnetic flux densities may be used as the materials thereof In either of these cases, about the same advantages as the advantages of the above-described embodiment can be obtained. When the magnetic materials having different saturation magnetic flux densities are used, for example, it is preferable for the following reason that the saturation magnetic flux density of the magnetic material for constituting the basic magnetic layer 116 be higher than the saturation magnetic flux density of the magnetic material for constituting the top magnetic layer 16C. That is, in general, the operation of the thin film magnetic head (e.g., the recording of information, etc.) is mainly executed by the action of a magnetic flux propagating through the second pole tip portion 16A which is closer to the write gap layer 15 than the first pole tip portion 16C(1) of the top magnetic layer 16C. When two types of magnetic materials having different saturation magnetic flux densities are used, it is therefore preferable to construct a profile of magnetic flux (hereinafter sometimes referred to as "a magnetic flux density profile") in the uniform width portion (the second pole tip portion 16A and the first pole tip portion 16C(1)) for defining the write track width on the recording medium so that the second pole tip portion 16A for functioning as a bottom layer region of the uniform width portion has a higher saturation magnetic flux density than the first pole tip portion 16C(1) for functioning as a top layer region of the uniform width portion has. However, the invention is not limited to this example. Two types of magnetic materials having different saturation magnetic flux densities are selectively used so as to form the uniform width portion having the two-layer structure, and thus the magnetic flux density profile of the uniform width portion can be optionally adjusted.

Moreover, in the embodiment, electroplating is used as a method of forming the bottom shield layer 4 and the top shield layer 8, but the invention is not necessarily limited to this embodiment. For example, the same method as the method of forming the bottom magnetic layer 10B and the like, namely, sputtering and etching, may be used as the method of forming the bottom shield layer 3 and/or the top shield layer 8. In this case, iron nitride, an amorphous alloy (e.g., a cobalt-iron alloy) or the like, as well as the above-mentioned Permalloy, may be used as a material of the bottom shield layer 4 and the top shield layer 8. The use of the same method as the method of forming the bottom magnetic layer 10B and the like allows forming the bottom shield layer 3 and the top shield layer 8 with higher accuracy in a shorter time, and therefore this also contributes to the reduced time for manufacturing the whole thin film magnetic head.

Moreover, in the embodiment, a photoresist is used as a material of the insulating film 13, but the invention is not necessarily limited to this embodiment. For example, a polyimide resin, SOG (spin on glass) or the like exhibiting fluidity during heating similarly to the photoresist may be used. Also in this case, the same advantages as the advantages of the above-described embodiment can be obtained.

Moreover, in the embodiment, heat treatment for allowing a photoresist to flow and fill up the gap between the windings of the thin film coil 12 is used so as to form the insulating film 13 made of the photoresist, but the invention is not necessarily limited to this embodiment. For example, CVD (chemical vapor deposition) may be used so as to form the insulating film 13 made of alumina. The use of CVD allows filling the gap between the windings of the thin film coil 12 with alumina without the need for heat treatment or the like. When CVD is used to form the insulating film 13 made of alumina, the insulating film 13 may also function as the insulating film 14 to be formed in the following step. In this case, the number of manufacturing steps can become smaller than the number of manufacturing steps required to separately form the insulating films 13 and 14.

Moreover, in the embodiment, alumina is used as a material of the write gap layer 15 and sputtering is used as a method of forming the write gap layer 15, but the invention is not necessarily limited to this embodiment. Besides alumina, an inorganic insulating material such as aluminum nitride (AlN), silicon oxide or silicon nitride may be used as the material of the write gap layer 15, or a nonmagnetic metal such as tantalum (Ta), titanium tungsten (WTi) or titanium nitride (TiN) may be used as the material thereof. Besides sputtering, CVD (chemical vapor deposition) may be used as the method of forming the write gap layer 15. When this method is used to form the write gap layer 15, this allows preventing the gap layer from containing a pinhole or the like and therefore permits avoiding the leakage of magnetic flux through the write gap layer 15. This advantage is effective, particularly when the thickness of the write gap layer 15 is reduced.

Moreover, in the embodiment, the coil connecting portion 12S is provided at the inner terminal end of the thin film coil 12, but the invention is not necessarily limited to this embodiment, and, for example, the coil connecting portion 12S may be provided at the outer terminal end of the thin film coil 12. Also in this case, the coil connecting wiring 16CH is provided so as to be connected to the coil connecting portion 12S, and thus, about the same advantages as the advantages of the above-described embodiment can be obtained.

[Second Embodiment]

Next, a second embodiment of the invention will be described.

Figures 21A, 21B:
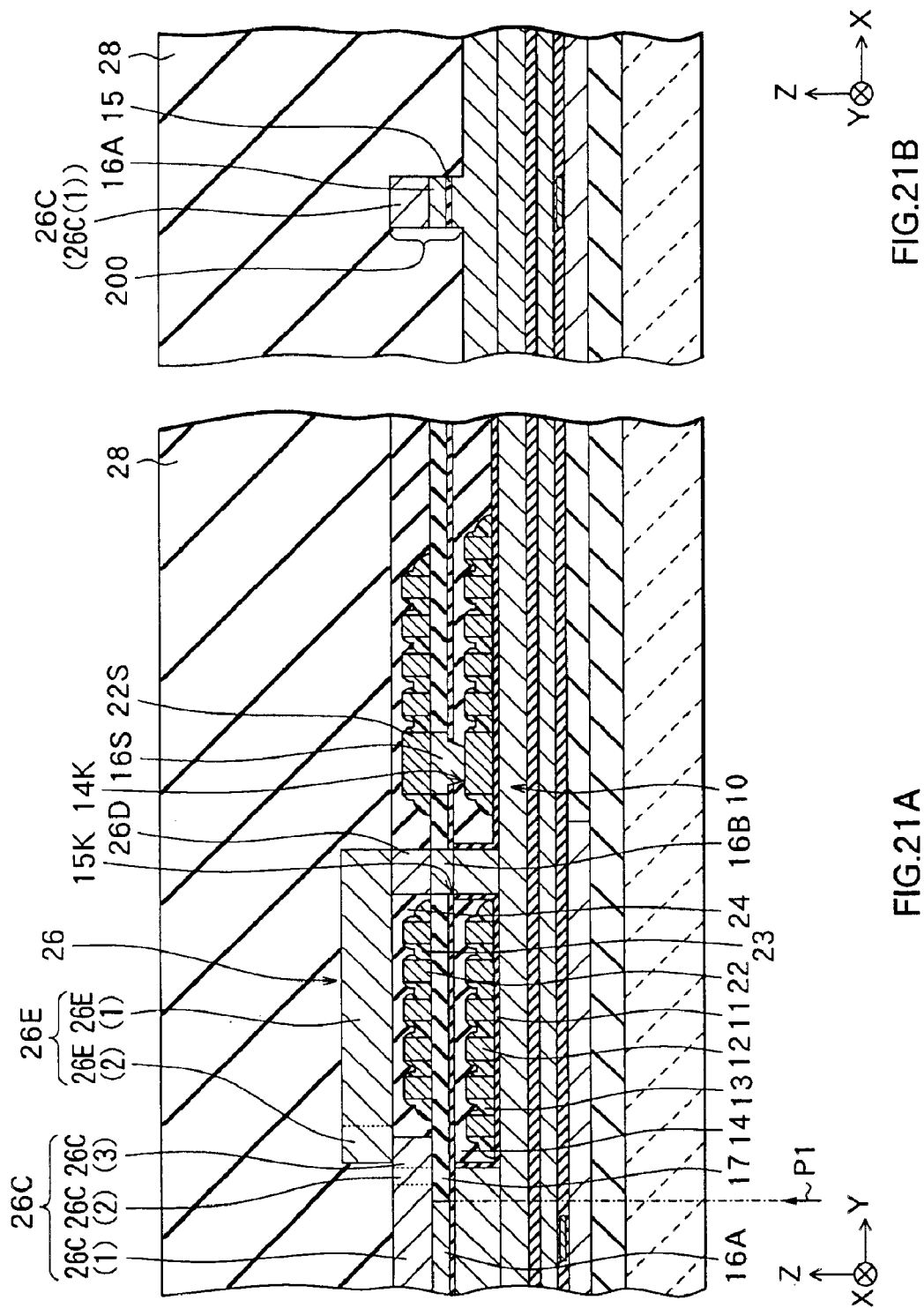
FIGS. 21A and 21B are cross sectional views for describing a step following the step of FIGS. 20A and 20B.
Figures 22A, 22B:
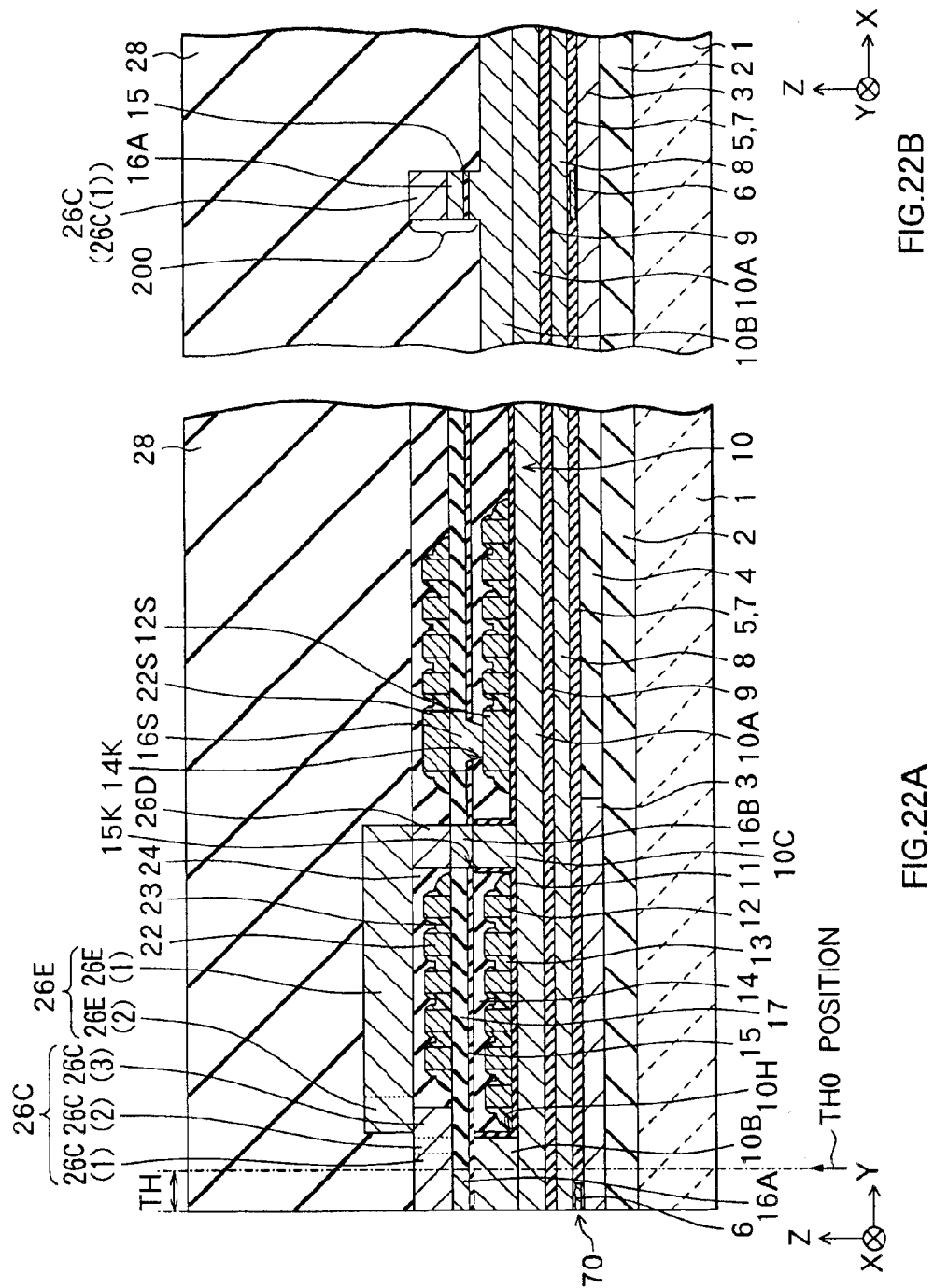
FIGS. 22A and 22B are cross sectional views for describing a step following the step of FIGS. 21A and 21B.
Figure 23:
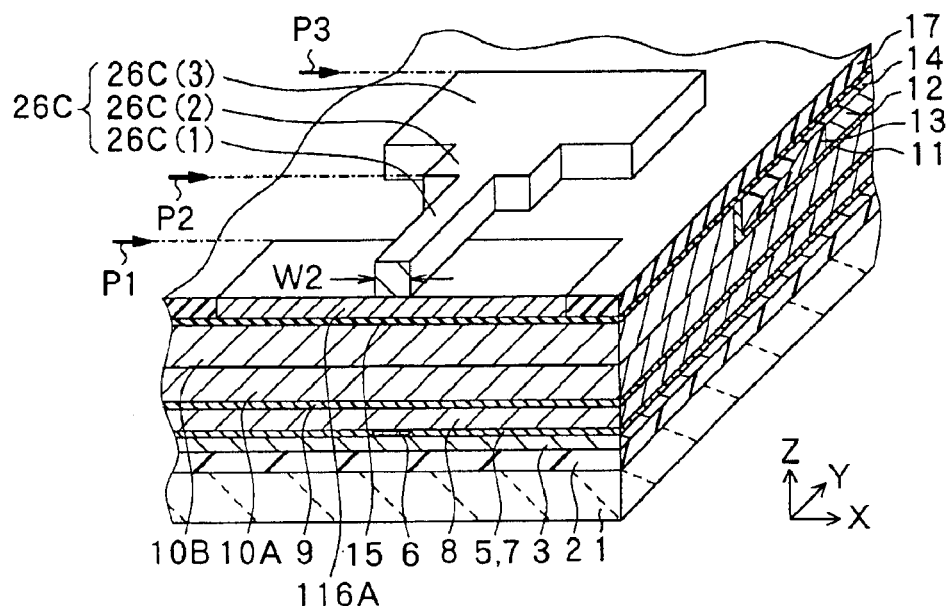
FIG. 23 is a perspective view corresponding to the cross sectional views shown in FIGS. 19A and 19B.
Figure 24:
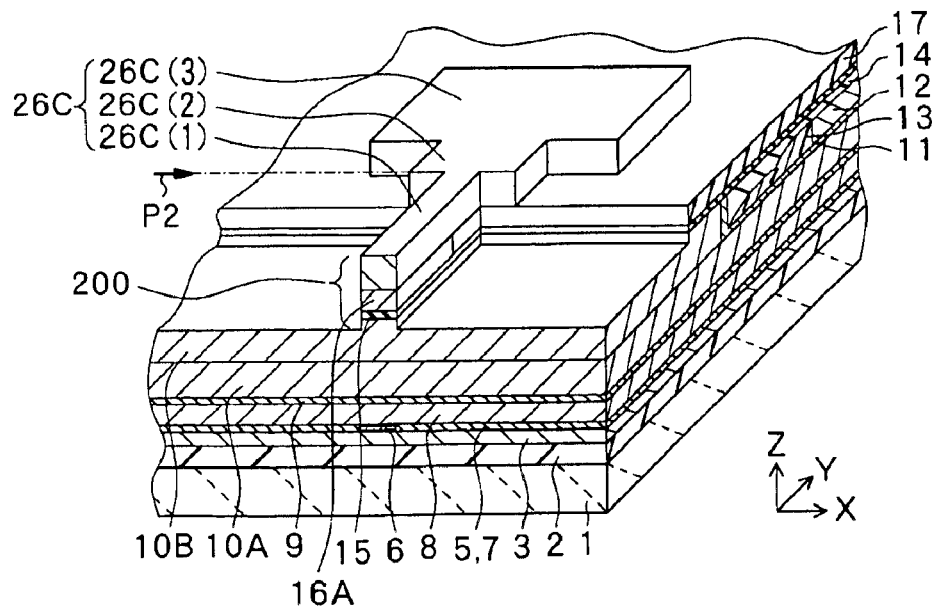
FIG. 24 is a perspective view corresponding to the cross sectional views shown in FIGS. 20A and 20B.
Figure 25:
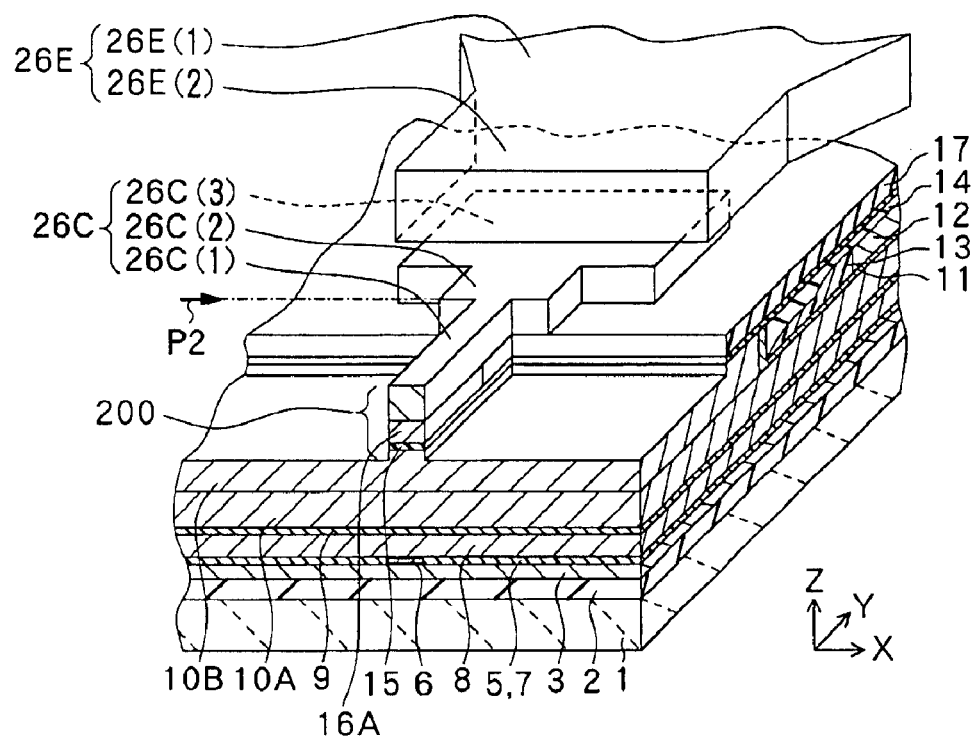
FIG. 25 is a perspective view corresponding to the cross sectional views shown in FIGS. 21A and 21B.

Firstly, the description is given with reference to FIGS. 19A and 19B to FIG. 25 with regard to a method of manufacturing a composite thin film magnetic head as a method of manufacturing a thin film magnetic head according to the second embodiment of the invention. FIGS. 19A, 20A, 21A and 22A show a cross section of the thin film magnetic head perpendicular to the air bearing surface, and FIGS. 19B, 20B, 21B and 22B show a cross section parallel to the air bearing surface. FIGS. 23 to 25 are perspective views corresponding to main manufacturing steps. FIG. 23 corresponds to a state shown in FIGS. 19A and 19B, FIG. 24 corresponds to a state shown in FIGS. 20A and 20B, and FIG. 25 corresponds to a state shown in FIGS. 21A and 21B. FIG. 23 does not show a photoresist film 91 shown in FIGS. 19A and 19B, FIG. 24 does not show a third precursory insulating layer 24P shown in FIGS. 20A and 20B, and FIG. 25 does not show an overcoat layer 28 shown in FIGS. 21A and 21B. The expressions of the X-axis, Y-axis and Z-axis directions in FIGS. 19A and 19B to FIG. 25 are the same as the expressions thereof in the above-described first embodiment. In FIGS. 19A and 19B to FIG. 25, the same parts as the elements of the above-described first embodiment are indicated by the same reference numerals.

In the method of manufacturing a thin film magnetic head according to the second embodiment, the step of forming the insulating film 17 shown in FIG. 19A and the preceding steps are the same as the step of forming the insulating film 17 shown in FIG. 5A and the preceding steps in the above-described first embodiment, and thus the description thereof is omitted.

In the second embodiment, after forming the insulating film 17, a top magnetic layer 26C made of a magnetic material containing iron, nickel and cobalt and having a high saturation magnetic flux density, e.g., an iron-nickel-cobalt alloy (e.g., an iron-nickel-cobalt alloy having the composition of 45 wt % Co, 30 wt % Ni and 25 wt % Fe), is selectively formed with a thickness of about 1.0 μm to 2.0 μm on a region extending from on the top precursory magnetic layer 116A to on the insulating film 17 by means of, for example, frame plating, as shown in FIGS. 19A, 19B and 23. At the same time when the top magnetic layer 26C is formed, a magnetic path connecting portion 26D is selectively formed on the magnetic path connecting portion 16B. Both the top magnetic layer 26C and the magnetic path connecting portion 26D constitute a part of a top pole 26. A material containing at least one of chromium (Cr), boron (B), gold (Au) and copper (Cu), as well as the above-mentioned three metallic elements, may be used as a material of the top magnetic layer 26C and the like.

The top magnetic layer 26C is formed so as to have a planar shape shown in FIG. 26 to be described later, for example, and so as to include a first pole tip portion 26C(1), a middle portion 26C(2) and a rear end portion 26C(3), which are arranged in this order when viewed at the side to form the air bearing surface 70 in the following step (the left side in FIG. 19). These portions are positioned so that the coupling position P2 (the second position) between the first pole tip portion 26C(1) and the middle portion 26C(2) is located rearward with respect to the position P1 (the first position) of the rear edge of the top precursory magnetic layer 116A and so that the position P3 (the third position) of a rear edge of the rear end portion 26C(3) is located frontward with respect to the thin film coil 12. Structural features of the top magnetic layer 26C will be described later. In the second embodiment, the first pole tip portion 26C(1) corresponds to a specific example of "a uniform width portion" of the invention, and the middle portion 26C(2) and the rear end portion 26C(3) collectively correspond to a specific example of "a wide portion" of the invention. The top magnetic layer 26C corresponds to a specific example of "a first magnetic layer portion" of the invention.

Next, as shown in FIGS. 19A and 19B, the photoresist film 91 is selectively formed so as to coat, for example, a region located rearward with respect to the position P1 (the first position) of the rear edge of the top precursory magnetic layer 116A. The existence of the photoresist film 91 allows preventing the insulating film 17 from being etched at the time of the etching process for forming the second pole tip portion 16A, a pole portion 200 and so on in the following step.

Figure 20A:
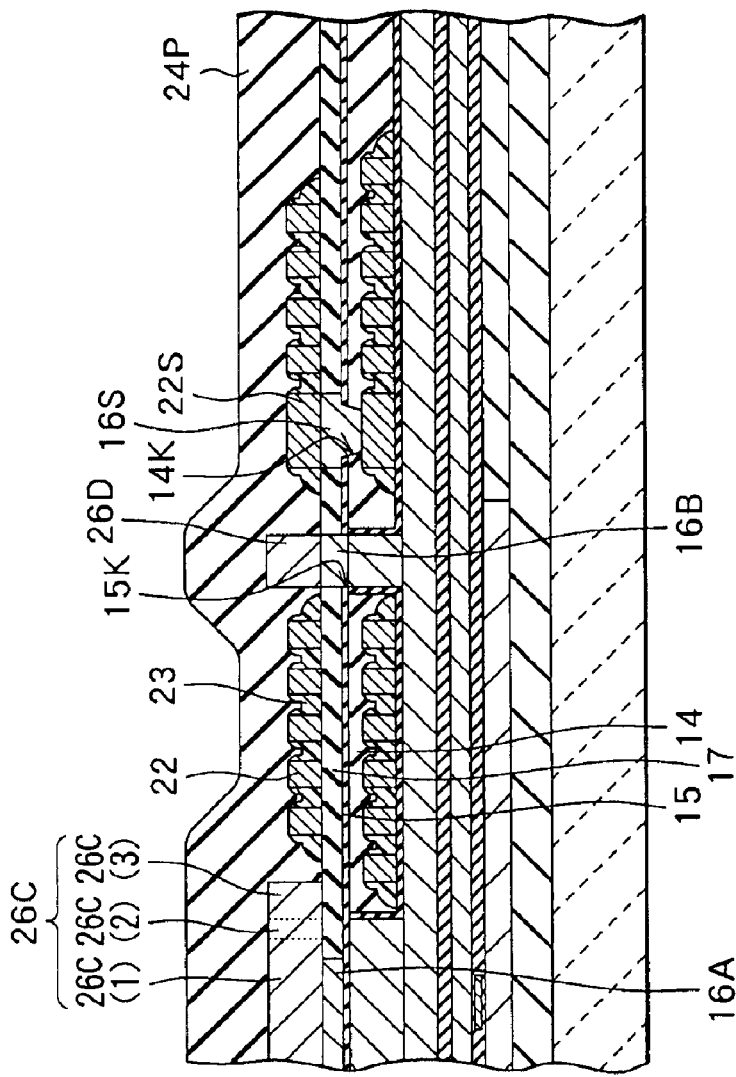
FIGS. 20A and 20B are cross sectional views for describing a step following the step of FIGS. 19A and 19B.
Figure 20B:
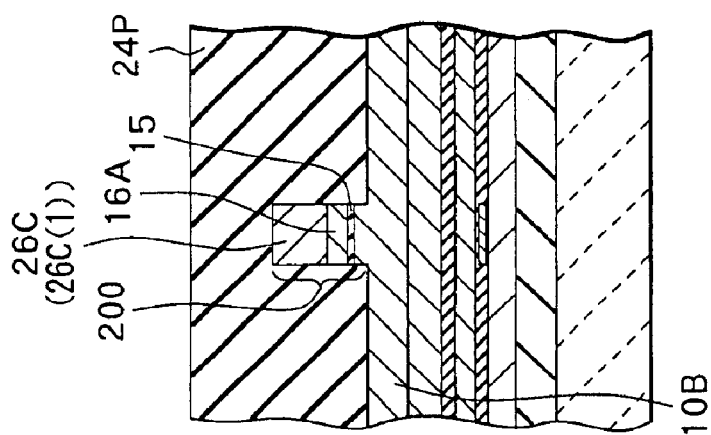

Next, the overall surface is subjected to the etching process by means of, for example, RIE using the top magnetic layer 26C and the photoresist film 91 as a mask. For the etching process using RIE, for example, the etching conditions (the type of etching gas, the processing temperature and so on) are adjusted as in the case of the etching process for forming the second pole tip portion 16A and the pole portion 100 of the above-described first embodiment. The etching process removes the respective parts of the top precursory magnetic layer 116A, the insulating film 17, the write gap layer 15 and the bottom magnetic layer 10B in a region located frontward with respect to the coupling position P2 between the first pole tip portion 26C(1) and the middle portion 26C(2). Thus, as shown in FIGS. 20A, 20B and 24, the second pole tip portion 16A for constituting a part of the top pole 26 is formed, and the pole portion 200 having the trim structure is also formed. For the etching process for forming the second pole tip portion 16A and so on, for example, the etching conditions are adjusted so that the amount of etching of the top magnetic layer 26C is much smaller than the amount of etching of a peripheral region around the top magnetic layer 26C, so as to prevent a decrease in a film thickness of the top magnetic layer 26C.

Next, after removing the photoresist film 91, as shown in FIG. 20A, a thin film coil 22 made of, for example, copper for an inductive recording head is selectively formed with a thickness of about 0.8 $\mu$m to 1.5 $\mu$m on the flattened insulating film 17 over the thin film coil 12 by means of electroplating, for example. At the same time, for example, a coil connecting portion 22S for constituting an inner terminal end of the thin film coil 22 is integrally formed with the thin film coil 22 on the coil connecting portion 16S, and a terminal 22X (not shown in FIG. 20A, see FIG. 26) for constituting an outer terminal end of the thin film coil 22 is integrally formed with the thin film coil 22. The thin film coils 12 and 22 are connected through the coil connecting portion 16S in the opening 14K. The thin film coil 22 is formed so as to have a winding structure shown in FIG. 26 to be described later, for example. In the second embodiment, the thin film coil 22 corresponds to a specific example of "a second thin film coil" of the invention, and the thin film coils 12 and 22 correspond to a specific example of "a thin film coil" of the invention.

Next, as shown in FIG. 20A, an insulating film 23 for providing insulation between windings of the thin film coil 22 and the like is formed. A material of the insulating film 23, a method of forming the insulating film 23, structural features of the insulating film 23 and the like are substantially the same as those of the insulating film 13 of the above-described first embodiment.

Next, as shown in FIGS. 20A and 20B, the third precursory insulating layer 24P made of, for example, alumina is formed with a thickness of about 3.0 $\mu$m to 4.0 $\mu$m by means of, for instance, sputtering so as to coat the overall surface, and thus a region having an uneven structure comprising the top magnetic layer 26C, the magnetic path connecting portion 26D, the thin film coil 22, the coil connecting portion 22S and so forth is filled with the third precursory insulating layer 24P.

Next, the overall surface of the third precursory insulating layer 24P is polished and flattened by means of CMP, for example. By this polishing, an insulating film 24 for coating the thin film coil 22 and so on is formed as shown in FIG. 21A. The polishing takes place until at least the top magnetic layer 26C and the magnetic path connecting portion 26D are exposed. In the second embodiment, the insulating film 24 corresponds to a specific example of "a third insulating layer portion" of the invention. A portion of the write gap layer 15, which is located rearward with respect to the position P1 (the first position) of the rear edge of the second pole tip portion 16A, and the insulating films 11, 13, 14, 17, 23 and 24 collectively correspond to a specific example of "an insulating layer" of the invention.

Next, as shown in FIGS. 21A and 21B, a top yoke 26E for constituting a part of the top pole 26 is selectively formed with a thickness of about 2.0 $\mu$m to 3.0 $\mu$m on a flat region extending from on the top magnetic layer 26C to on the magnetic path connecting portion 26D. A material of the top yoke 26E and a method of forming the top yoke 26E are substantially the same as those of the top magnetic layer 16C of the above-described first embodiment, for instance. The top yoke 26E is formed so as to have a planar shape shown in FIG. 26 to be described later, for example. The top yoke 26E is magnetically coupled to the bottom magnetic layer 10A with the magnetic path connecting portions 26D and 16B and the bottom connecting portion 10C in between in the opening 15K and is also magnetically coupled to the second pole tip portion 16A with the top magnetic layer 26C in between. That is, the top pole 26 (the second pole tip portion 16A, the magnetic path connecting portions 16B and 26D, the top magnetic layer 26C and the top yoke 26E) is connected to the bottom pole 10 (the bottom magnetic layers 10A and 10B and the bottom connecting portion 10C), and thus a magnetic path is formed. Structural features of the top yoke 26E will be described later. In the second embodiment, the top pole 26 comprising the second pole tip portion 16A, the magnetic path connecting portions 16B and 26D, the top magnetic layer 26C and the top yoke 26E corresponds to a specific example of "a first magnetic layer" of the invention.

Next, as shown in FIGS. 22A and 22B, the overcoat layer 28 made of an insulating material, e.g., an inorganic insulating material such as alumina, is formed with a thickness of about 20 $\mu$m to 40 $\mu$m so as to coat the overall surface. A structure around the top yoke 26E is as shown in FIG. 25.

Finally, as shown in FIGS. 22A and 22B, the air bearing surface 70 of the recording head and the reproducing head is formed through the steps of machining and polishing, and thus a thin film magnetic head is completed.

Figure 26:
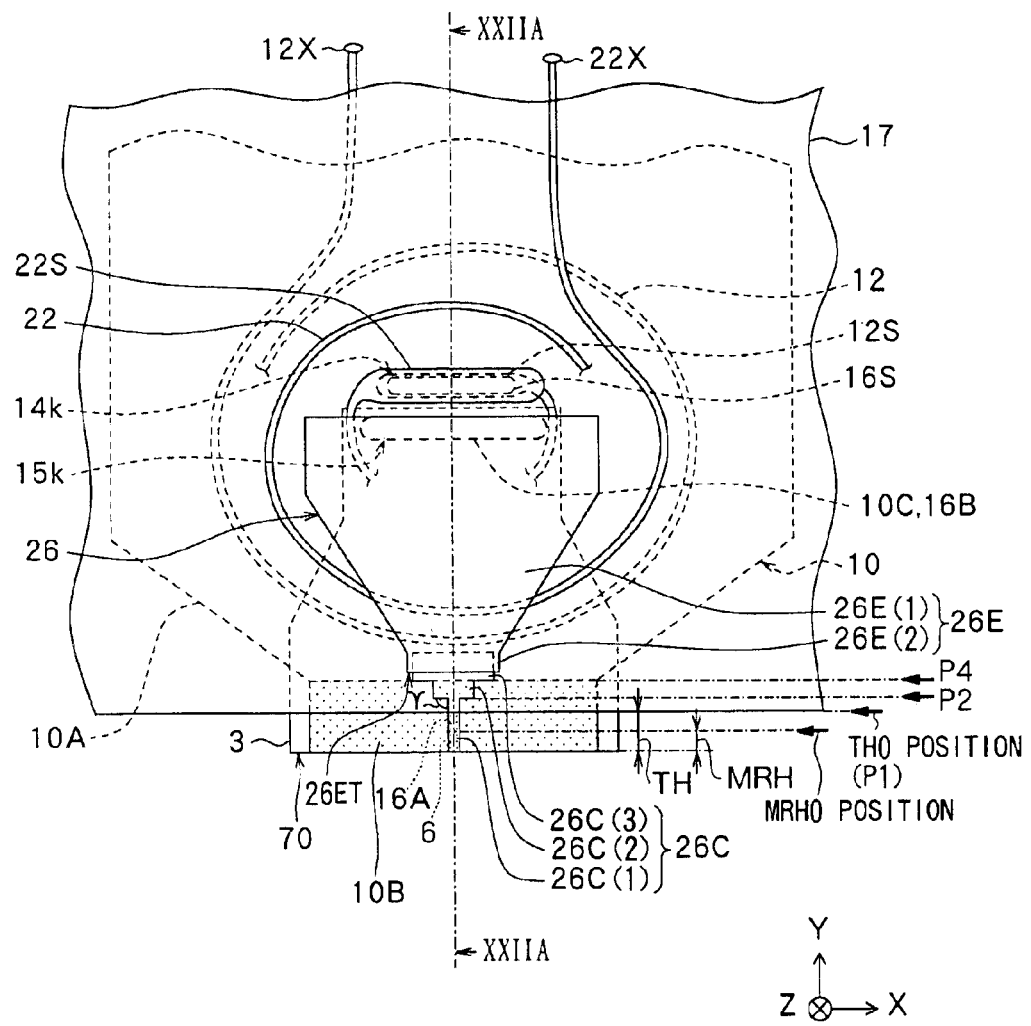
FIG. 26 is a plan view showing a planar structure of a thin film magnetic head according to the second embodiment of the invention.

FIG. 26 shows a schematic representation of a planar structure of the thin film magnetic head manufactured by the method of manufacturing a thin film magnetic head according to the second embodiment. In FIG. 26, the same parts as the elements of the above-described first embodiment shown in FIG. 14 are indicated by the same reference numerals. FIG. 26 does not show the insulating films 11, 13, 14, 23 and 24, the overcoat layer 28 and so on. The thin film coil 22, only a part of its outermost periphery, is shown in FIG. 26. FIG. 22A corresponds to a cross section viewed in the direction of the arrows along the line XXIIA—XXIIA of FIG. 26. The expressions of the X-axis, Y-axis and Z-axis directions in FIG. 26 are the same as the expressions thereof in FIGS. 19A and 19B to FIG. 25.

As described above, for example, the top pole 26 comprises the second pole tip portion 16A, the magnetic path connecting portions 16B and 26D, the top magnetic layer 26C and the top yoke 26E, which are separately formed.

The top magnetic layer 26C includes the first pole tip portion 26C(1), the middle portion 26C(2) and the rear end portion 26C(3), which are arranged in this order when viewed at the side of the air bearing surface 70. For example, each of these portions 26C(1), 26C(2) and 26C(3) has about the same structural features as each of the corresponding portions of the top magnetic layer 16C of the above-described first embodiment (e.g., the first pole tip portion 16C(1) corresponding to the first pole tip portion 26C(1)) has.

The top yoke 26E includes a yoke portion 26E(1) having a large area for containing a magnetic flux generated by the thin film coils 12 and 22, and a connecting portion 26E(2) having a uniform width smaller than a width of the yoke portion 26E(1). The yoke portion 26E(1) has about the same structural features as the yoke portion 16C(4) of the top magnetic layer 16C of the above-described first embodiment has. For example, the width of the connecting portion 26E(2) is greater than a width of the rear end portion 26C(3)

of the top magnetic layer 26C. However, the relative widths of these portions 26E(2) and 26C(3) are not necessarily limited to this example, and, for instance, the width of the connecting portion 26E(2) may be smaller than the width of the rear end portion 26C(3). For example, a position of a front edge surface 26ET of the top yoke 26E is located rearward with respect to a coupling position between the middle portion 26C(2) and the rear end portion 26C(3) of the top magnetic layer 26C. That is, the top yoke 26E is located apart from the air bearing surface 70. The position of the top yoke 26E is not necessarily limited to the above-mentioned position, and, for example, the top yoke 26E may be positioned so that the position of the edge surface 26ET substantially matches the coupling position between the middle portion 26C(2) and the rear end portion 26C(3). The centers of the top yoke 26E and the top magnetic layer 26C in the width direction match each other.

Both the terminal 12X constituting the outer terminal end of the thin film coil 12 and the terminal 22X constituting the outer terminal end of the thin film coil 22 are connected to an external circuit (not shown) so that the external circuit can feed a current through the thin film coils 12 and 22.

Structural features of the elements shown in FIG. 26, except for the above-mentioned elements, are the same as the structural features of the elements of the above-described first embodiment (see FIG. 14).

In the second embodiment, two coil layers for generating a magnetic flux (the thin film coils 12 and 22) are provided, and therefore a coil length of the two coil layers is greater than a coil length of one coil layer of the above-described first embodiment. This increases the amount of generated magnetic flux and therefore contributes to the ensured superior overwrite characteristics.

Moreover, in the second embodiment, the top magnetic layer 26C is formed on the flat surface obtained through polishing, and therefore the top magnetic layer 26C can be formed with higher accuracy by the same function as the function of the above-described first embodiment in which the top magnetic layer 16C and the like are formed on the flat surface. The advantage of improving the accuracy in forming the top magnetic layer 26C holds true for the formation of the top yoke 26E.

Figures 27A, 27B:
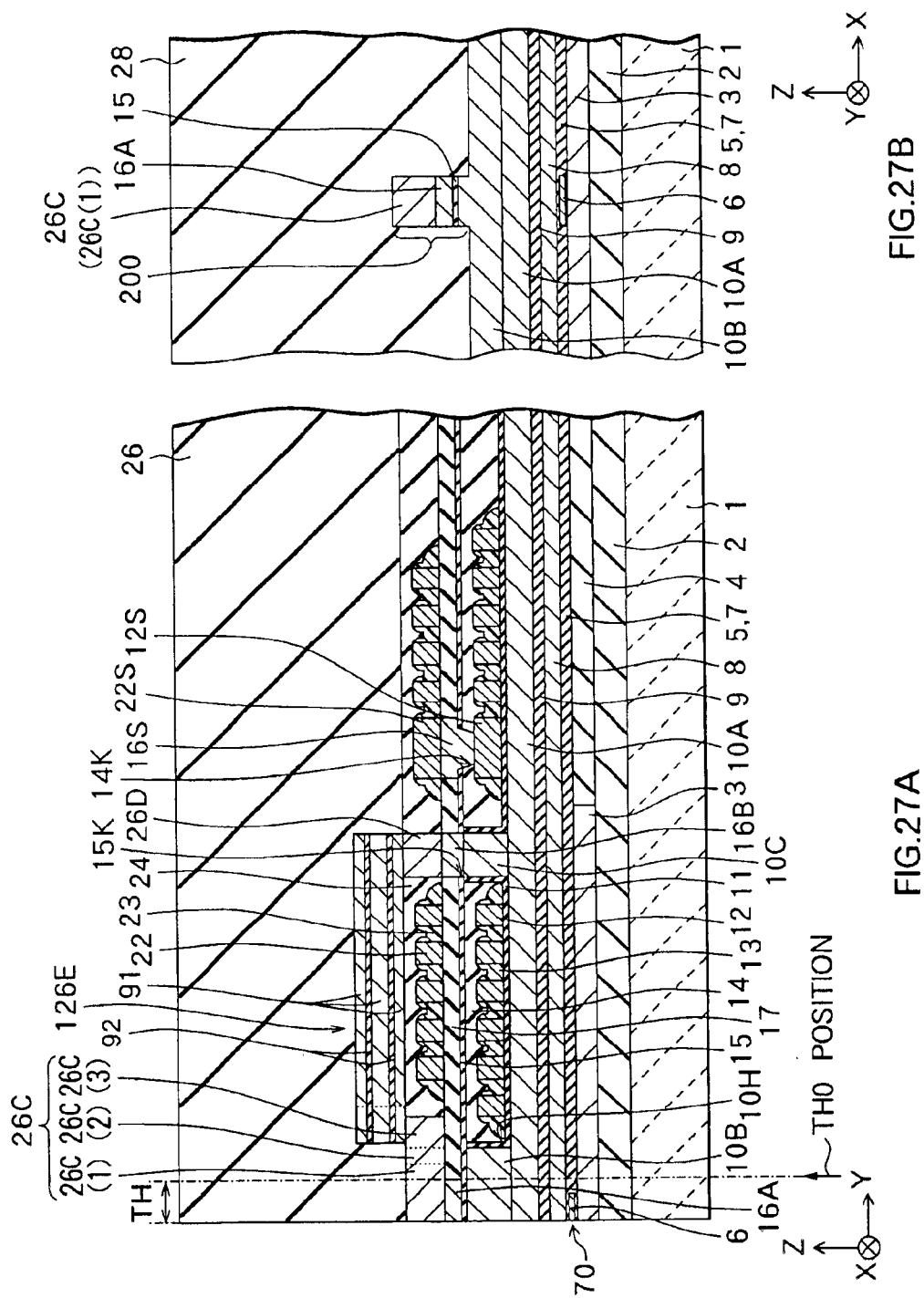
FIGS. 27A and 27B are cross sectional views of a structure of a thin film magnetic head according to a modification of the second embodiment of the invention.

In the second embodiment, the description is given with regard to the case where the top yoke (26E) has a single-layer structure of iron nitride (see FIGS. 22A and 22B), but the invention is not necessarily limited to this embodiment. For example, as shown in FIGS. 27A and 27B, a top yoke (126E) may have a laminated structure comprising a high saturation magnetic flux density material layer 91 such as iron nitride alternating with an inorganic insulating material layer 92 such as alumina. The top yoke having such a structure can prevent the generation of eddy current in the magnetic path and therefore improve RF characteristics. The use of RIE to form both of the above-mentioned high saturation magnetic flux density material layer 91 and inorganic insulating material layer 92 allows reducing the time required for forming the layers 91 and 92. The parts shown in FIGS. 27A and 27B, except for the top yoke 126E, are the same as the above-mentioned parts shown in FIGS. 22A and 22B.

Functions, advantages, modifications and the like of the thin film magnetic head or the method of manufacturing the same according to the second embodiment, except for the above-mentioned respects, are the same as those of the thin film magnetic head or the method of manufacturing the same according to the above-described first embodiment, and thus the description thereof is omitted.

Although the invention is described above by referring to some embodiments, the invention is not limited to these embodiments and various modifications of the invention are possible.

For example, the method of manufacturing a composite thin film magnetic head is described by referring to the above-mentioned embodiments and the modifications thereof, but the invention may be applied to a record-only thin film magnetic head having an inductive magnetic transducer for writing or a thin film magnetic head having an inductive magnetic transducer for both recording and reproducing. The invention may be applied to a thin film magnetic head having a structure in which the element for writing and the element for reading are laminated in reverse order.

The planar shapes of the magnetic layer portions (the second pole tip portion, the top magnetic layer, the magnetic path connecting portion, the top yoke, the bottom magnetic layer, the bottom connecting portion, etc.) constituting the top pole and the bottom pole described by referring to the above-mentioned embodiments are not necessarily limited to the planar shapes shown in FIGS. 14 and 26. The planar shapes can be optionally changed, as long as the magnetic volumes of the magnetic layer portions can be optimized so as to permit a sufficient supply of a magnetic flux generated by the thin film coil to the tip portion of the front end portion.

Although the description is given by referring to the above-mentioned embodiments with regard to the structure of the thin film magnetic head having a one-layer or two-layer coil structure, the number of thin film coil layers of the embodiments can be optionally changed. The increase of the number of thin film coil layers allows the increase of the amount of generated magnetic flux.

As described above, according to the thin film magnetic head or the method of manufacturing a thin film magnetic head of the invention, the first thin film coil is provided in the recess region provided in the second magnetic layer, and therefore this makes it possible to appropriately ensure the thickness of the first thin film coil, as well as to form the second magnetic layer portion with higher accuracy, as distinct from the case where the first thin film coil is not provided in the recess region. Accordingly, it is possible to ensure superior overwrite characteristics, as well as to form the second magnetic layer portion having an extremely small uniform width.

When the boundary surface between the second magnetic layer portion and the second insulating layer portion forms a flat surface, this makes it possible to uniquely determine the position of the edge of the second insulating layer portion close to the recording-medium-facing surface, namely, the throat height zero position that is one of factors that determine the performance of the recording head, as distinct from the case where the above-mentioned boundary surface is not flat.

When the recess region is formed through the use of a part of the thickness of the first magnetic film pattern and the thickness of the second magnetic film pattern, the position of the surface of the underlayer on which the first thin film coil is to be formed is located lower than the position of the surface of the underlayer on which the first thin film coil is to be formed in the case where the recess region is formed through the use of the thickness of the second magnetic film pattern. In this case, a space region for increasing the thickness of the first thin film coil is ensured over the first thin film coil, and therefore the thickness of the first thin film coil can become still greater.

When a magnetic material for constituting the second magnetic layer portion has a saturation magnetic flux density which is equal to or higher than a saturation magnetic flux density of a magnetic material for constituting the first magnetic layer portion, the second magnetic layer portion ensures smooth propagation of magnetic flux through the second magnetic layer portion even if variations occur in the characteristics of propagation of magnetic flux through the first magnetic layer portion. Therefore, this also contributes to the ensured superior overwrite characteristics.

When the twelfth step of forming the second magnetic layer portion takes place using reactive ion etching, the second magnetic layer portion can be formed with higher accuracy in a shorter time.

When the twelfth step of forming the second magnetic layer portion takes place in a gaseous atmosphere containing chlorine, the second magnetic layer portion can be formed with still higher accuracy in a still shorter time.

When forming the second magnetic layer portion at a temperature between 50 and 300 degrees Celsius inclusive, the second magnetic layer portion can be formed with still higher accuracy in a still shorter time.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head including: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and the second magnetic layers, the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position, while maintaining a uniform width for defining a write track width on the recording medium, the first magnetic layer portion including a uniform width portion and a widened portion, the uniform width portion extending from or near the recording-medium-facing surface to a second position located at or near the first position, while maintaining the same width as the uniform width of the second magnetic layer portion, the widened portion extending from the second position to a third position, and having a width greater than that of the uniform width portion, the method comprising:

a first step of forming a recess region by etching in the second magnetic layer close to the first magnetic layer;

a second step of forming a first thin film coil for constituting a part of the thin film coil in the recess region;

a third step of forming a first precursory insulating layer functioning as a preparatory layer for a first insulating layer portion, so as to coat at least the recess region of the second magnetic layer in which the first thin film coil is formed and a peripheral region around the recess region;

a fourth step of forming the first insulating layer portion by polishing and flattening the first precursory insulating layer until at least the second magnetic layer is exposed;

a fifth step of forming a precursory magnetic layer functioning as a preparatory layer for the second magnetic layer portion, on the gap layer in a region extending over a position at which the recording-medium-facing surface is to be located to the first position;

a sixth step of forming a second precursory insulating layer functioning as a preparatory layer for a second insulating layer portion, so as to coat at least the precursory magnetic layer and a peripheral region around the precursory magnetic layer;

a seventh step of polishing and flattening the second precursory insulating layer until at least the precursory magnetic layer is exposed, thereby forming the second insulating layer portion;

an eighth step of forming a second thin film coil adjacent to the second insulating layer portion so that most of the second thin film coil is included in a space defined by a thickness of the uniform width portion of the first magnetic layer portion;

a ninth step of forming the first magnetic layer portion on at least the precursory magnetic layer;

a tenth step of forming a third precursory insulating layer for functioning as a preparatory layer for the third insulating layer portion, so as to coat at least the first magnetic layer portion and the second thin film coil; and an eleventh step of polishing and flattening a surface of the third precursory insulating layer until at least the first magnetic layer portion is exposed, thereby forming the third insulating layer portion, wherein the insulating layer includes the first insulating layer portion for coating the first thin film coil, wherein the insulating layer further includes the second insulating layer portion adjacent to the first insulating layer portion, and wherein the third position of the first magnetic layer portion is located closer to the recording-medium-facing surface than the first thin film coil and the thin film coil further includes the second thin film coil electrically connected to the first thin film coil, wherein the insulating layer further includes the third insulating layer portion for coating the second thin film coil.

2. A method of manufacturing a thin film magnetic head according to claim 1, further comprising a twelfth step of selectively etching the precursory magnetic layer through the use of the uniform width portion of the first magnetic layer portion as a mask, after the ninth step, thereby forming the second magnetic layer portion.

3. A method of manufacturing a thin film magnetic head according to claim 2, in the twelfth step, the gap layer and the second magnetic layer portion are selectively removed to a predetermined depth, except for a region corresponding to the second magnetic layer portion.

4. A method of manufacturing a thin film magnetic head according to claim 2, wherein the twelfth step takes place using reactive ion etching.

5. A method of manufacturing a thin film magnetic head according to claim 4, wherein the twelfth step takes place in a gaseous atmosphere containing chlorine.

6. A method of manufacturing a thin film magnetic head according to claim 4, wherein the twelfth step takes place at a temperature between 50 and 300 degrees Celsius inclusive.

7. A method of manufacturing a thin film magnetic head including: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and the second magnetic layers; the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position, while maintaining a uniform width for defining a write track width on the recording medium, the first magnetic layer portion including a uniform width portion and a widened portion, the uniform width portion extending from or near the recording-medium-facing surface to a second position located at or near the first position, while maintaining the same width as the uniform width of the second magnetic layer portion, the widened portion extending from the second position to a third position, and having a width greater than that of the uniform width portion, the method comprising:

a first step of forming a recess region by etching in the second magnetic layer close to the first magnetic layer;

a second step of forming a first thin film coil for constituting a part of the thin film coil in the recess region, wherein the first step includes the steps of:

forming a first magnetic film pattern functioning as a part of the second magnetic layer;

selectively forming a second magnetic film pattern functioning as another part of the second magnetic layer, on the first magnetic film pattern except for the recess region; and etching and recessing the first magnetic film pattern to a predetermined depth through the use of the second magnetic film pattern as a mask.

* * * * *